(12) United States Patent
Hwang et al.

(10) Patent No.: US 11,172,448 B2
(45) Date of Patent: Nov. 9, 2021

(54) OPERATION METHOD OF COMMUNICATION NODE FOR SUPPORTING LOW POWER MODE IN WIRELESS LAN

(71) Applicant: ELECTRONICS AND TELECOMMUNICATIONS RESEARCH INSTITUTE, Daejeon (KR)

(72) Inventors: Sung Hyun Hwang, Daejeon (KR); Seung Keun Park, Daejeon (KR); Yong Ho Kim, Incheon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 103 days.

(21) Appl. No.: 16/612,329

(22) PCT Filed: May 8, 2018

(86) PCT No.: PCT/KR2018/005265
§ 371 (c)(1),
(2) Date: Nov. 8, 2019

(87) PCT Pub. No.: WO2018/208058
PCT Pub. Date: Nov. 15, 2018

(65) Prior Publication Data
US 2020/0275373 A1    Aug. 27, 2020

(30) Foreign Application Priority Data

| May 8, 2017 | (KR) | 10-2017-0057161 |
| May 8, 2017 | (KR) | 10-2017-0057163 |
| May 24, 2017 | (KR) | 10-2017-0064381 |
| Jul. 7, 2017 | (KR) | 10-2017-0086544 |

(51) Int. Cl.
*H04W 52/02* (2009.01)
*H04W 84/12* (2009.01)

(52) U.S. Cl.
CPC ........ *H04W 52/0235* (2013.01); *H04W 84/12* (2013.01)

(58) Field of Classification Search
CPC . H04W 52/0235; H04W 84/12; H04W 52/02; H04W 52/0212; H04W 52/0219
See application file for complete search history.

(56) References Cited

U.S. PATENT DOCUMENTS

| 9,351,250 B2 | 5/2016 | Jafarian et al. |
| 9,668,212 B2 | 5/2017 | Lee et al. |
| 9,924,462 B2* | 3/2018 | Huang .............. H04W 52/0229 |
| 2004/0047296 A1* | 3/2004 | Tzannes ............... H04L 1/1671 370/252 |

(Continued)

OTHER PUBLICATIONS

International Search Report for PCT/KR2018/005265 dated Aug. 16, 2018, 4 pages.

*Primary Examiner* — Mohammad S Anwar

(57) ABSTRACT

An operation method of a communication node for supporting a low power mode in a wireless LAN is disclosed. A method for operating an access point comprises: a step of transmitting a CTS frame to protect transmission of a wake-up packet, a step of transmitting the wake-up packet to wake up a station including PCR and WURx; and a step of transmitting a data frame to the station. Therefore, the performance of the communication system can be improved.

8 Claims, 22 Drawing Sheets

(56) References Cited

U.S. PATENT DOCUMENTS

| | | |
|---|---|---|
| 2005/0154933 A1 | 7/2005 | Hsu et al. |
| 2006/0112287 A1 | 5/2006 | Paljug |
| 2010/0240319 A1 | 9/2010 | Matsuo |
| 2014/0112225 A1 | 4/2014 | Jafarian et al. |
| 2014/0269462 A1 | 9/2014 | Jia et al. |
| 2015/0327262 A1 | 11/2015 | Kwon et al. |
| 2016/0021612 A1* | 1/2016 | Matsunaga ........... H04W 56/00 370/311 |
| 2016/0127995 A1 | 5/2016 | Merlin et al. |
| 2016/0374018 A1* | 12/2016 | Min ...................... H04L 5/0053 |
| 2017/0026907 A1 | 1/2017 | Min et al. |
| 2017/0111858 A1 | 4/2017 | Azizi et al. |
| 2017/0111866 A1 | 4/2017 | Park et al. |
| 2017/0272976 A1* | 9/2017 | Yang .................... H04L 27/2613 |
| 2017/0303208 A1* | 10/2017 | Suh ..................... H04W 52/346 |

\* cited by examiner

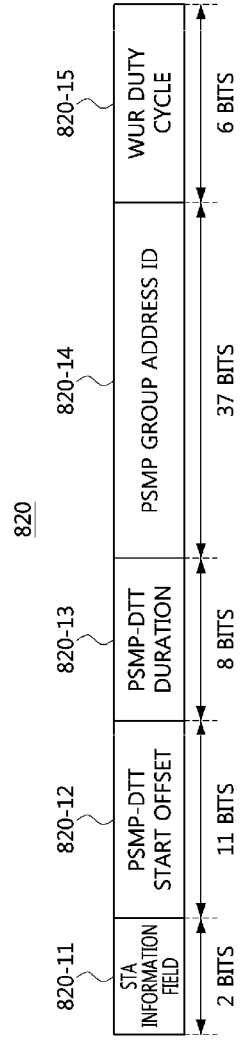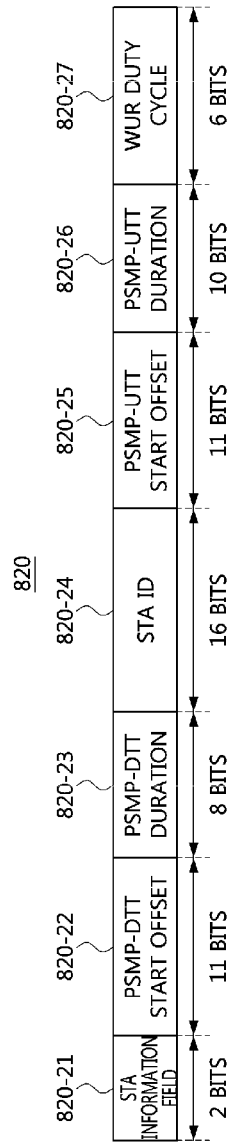

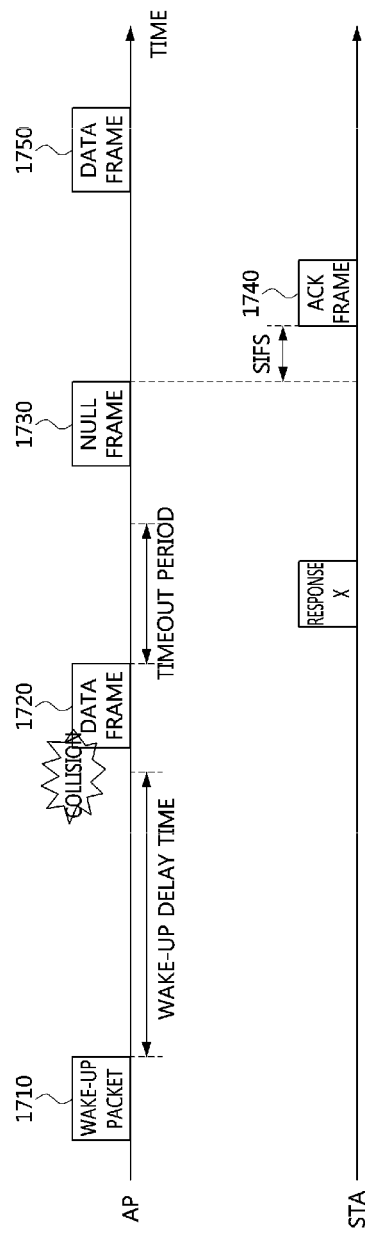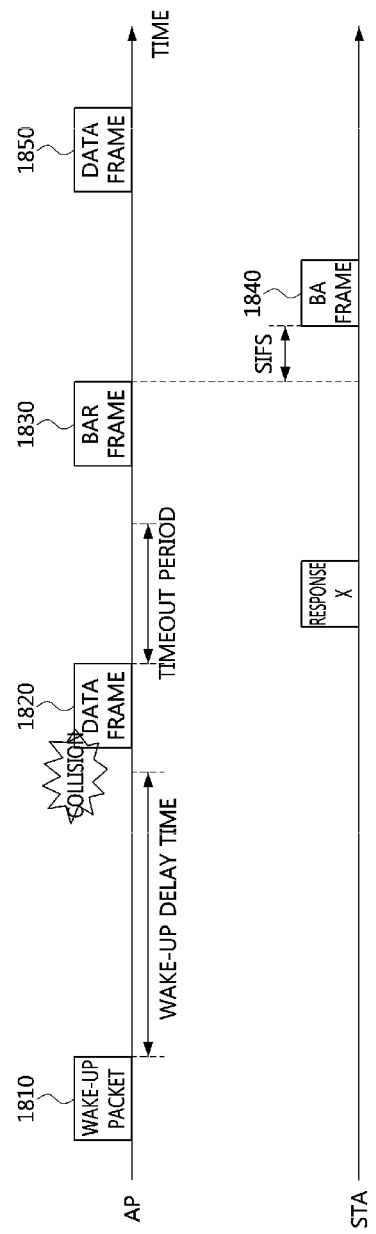

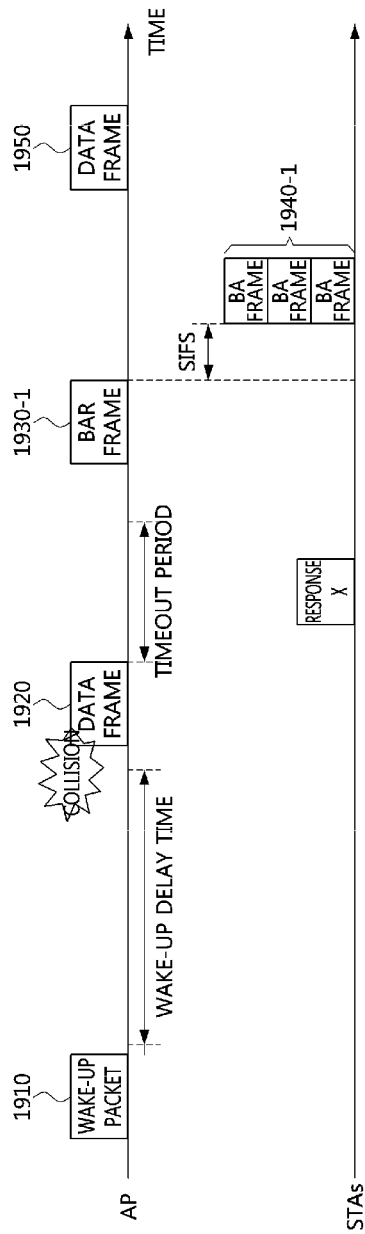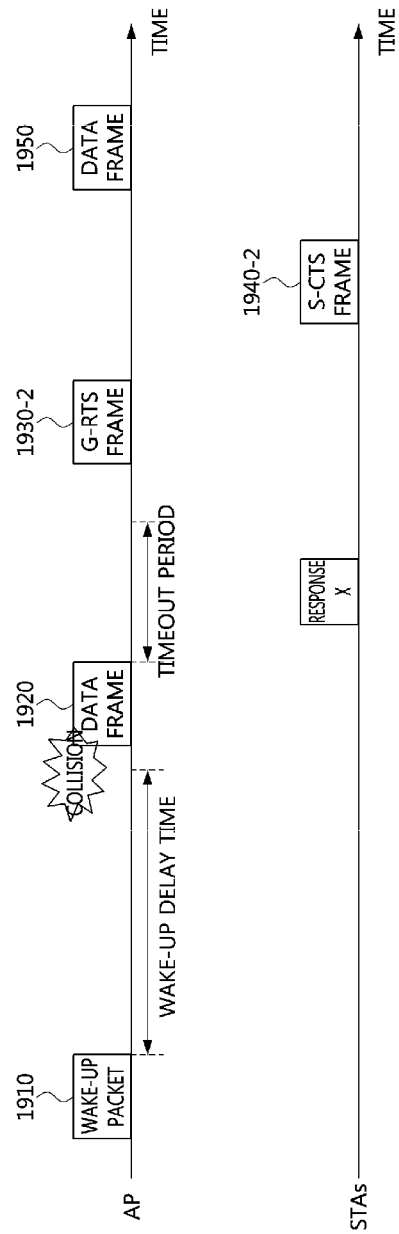

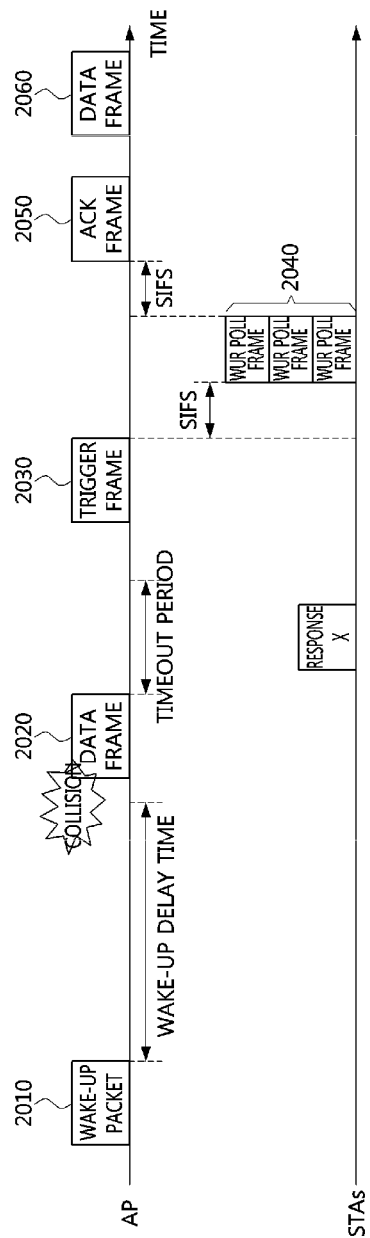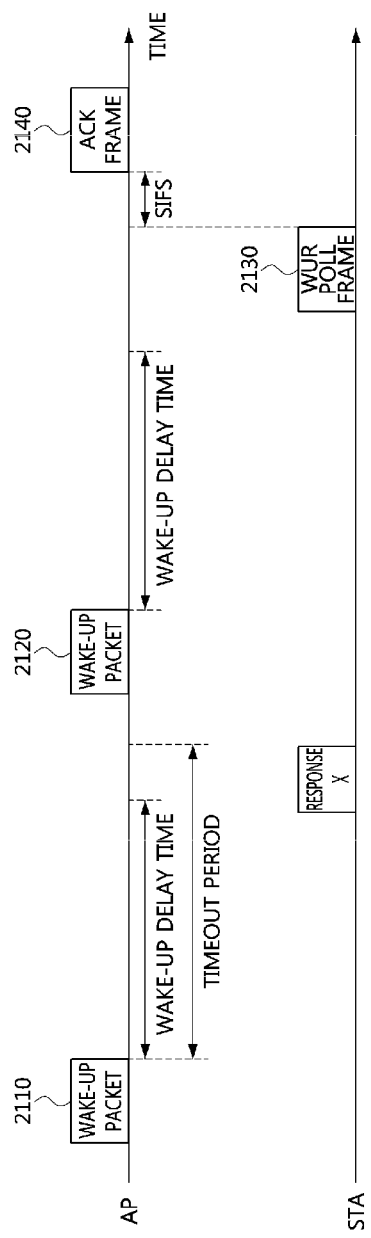

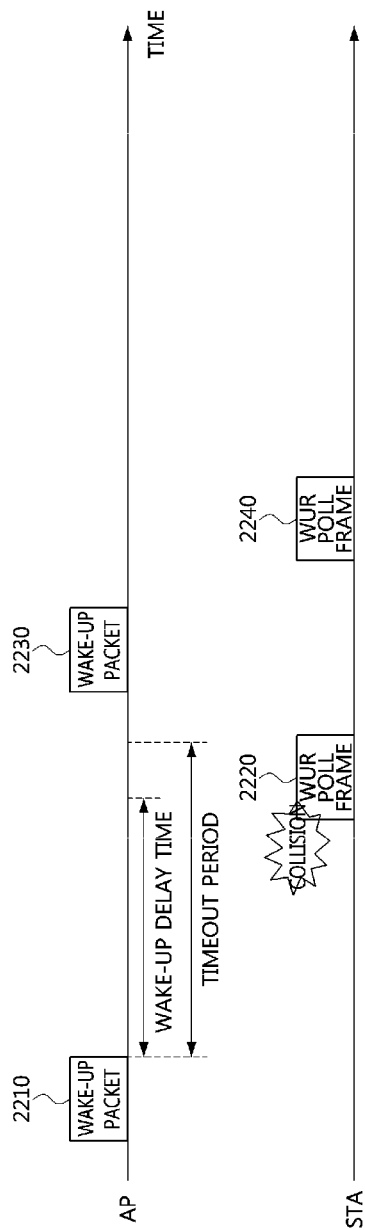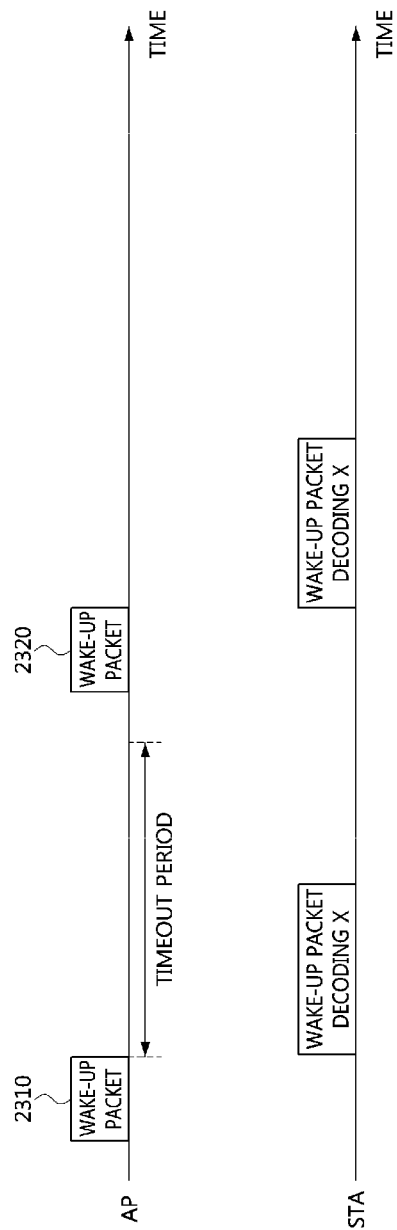

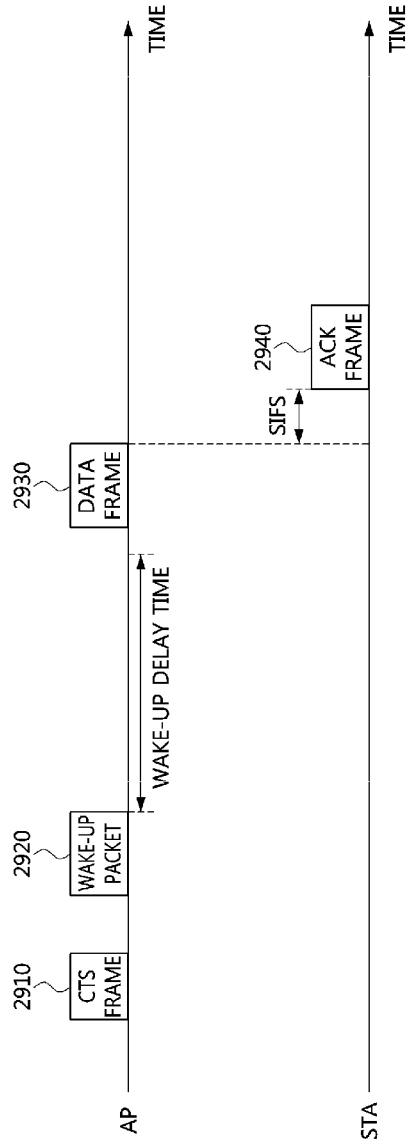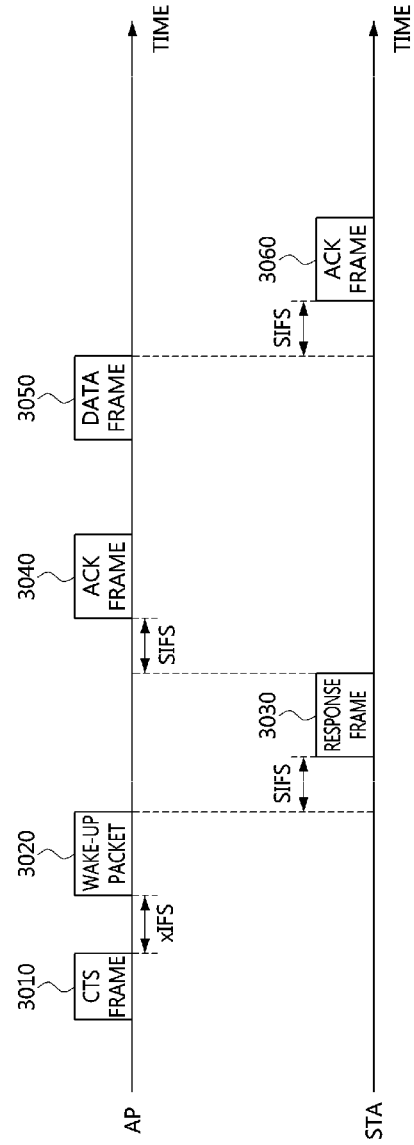

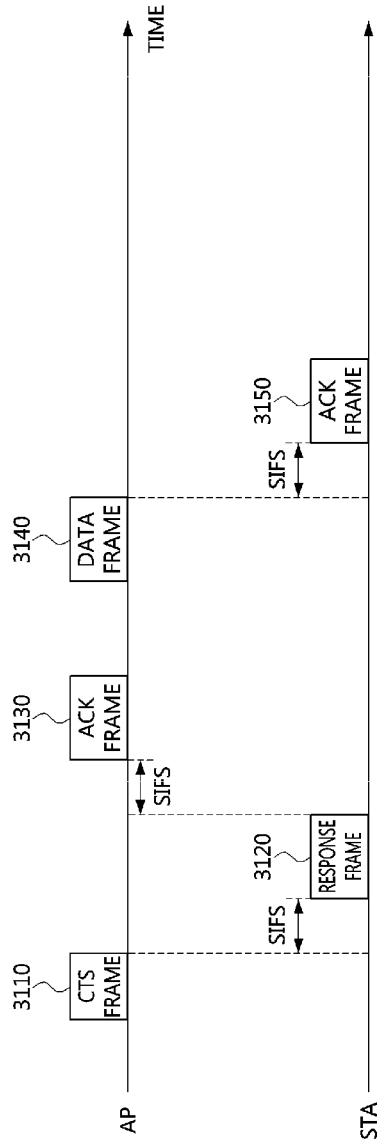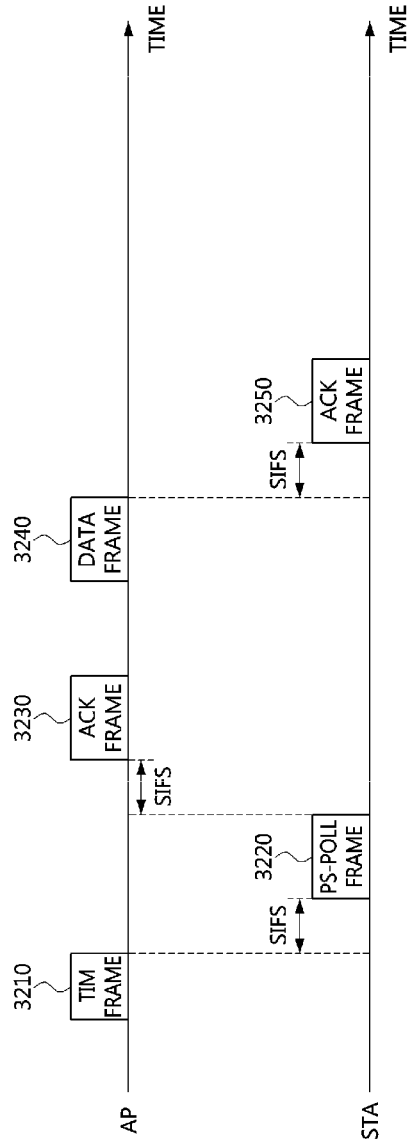

OPERATION METHOD OF COMMUNICATION NODE FOR SUPPORTING LOW POWER MODE IN WIRELESS LAN

CROSS-REFERENCE TO RELATED APPLICATIONS

The present application is a U.S. National State of PCT/KR2018/005265 filed May 8, 2018, which claims the priority of Korean Patent Application Nos. 10-2017-0057161, filed on May 8, 2017, 10-2017-0057163, filed on May 8, 2017, 10-2017-0064381, filed May 24, 2017, and 10-2017-0086544, filed Jul. 7, 2017 in the Korean Intellectual Property Office.

TECHNICAL FIELD

The present invention relates to a wireless local area network (WLAN) technology, and more particularly, to a technology for supporting a communication node operating in a low-power mode in a WLAN.

BACKGROUND ART

With the development of information and communications technology, various wireless communication technologies are under development. Among these wireless communication technologies, a WLAN enables wireless connection to the Internet at a home or business, or in specific service provision areas using a portable terminal, such as a personal digital assistant (PDA), a laptop computer, and a portable multimedia player (PMP), based on radio frequency (RF) technology.

As standards for WLAN technology, the Institute of Electrical and Electronics Engineers (IEEE) 802.11 standards are under development. The IEEE 802.11a provides a transmission speed of 54 Mbps using an unlicensed band at 5 GHz. The IEEE 802.11b provides a transmission speed of 11 Mbps using direct sequence spread spectrum (DSSS) at 2.4 GHz. The IEEE 802.11g provides a transmission speed of 54 Mbps using orthogonal frequency division multiplexing (OFDM) at 2.4 GHz.

The WLAN technology according to the IEEE 802.11n standard operates in the 2.4 GHz band and the 5 GHz band based on an orthogonal frequency division multiplexing (OFDM) scheme, and when multiple input multiple output (MIMO)-OFDM is used, a transmission speed of up to 300 Mbps can be provided through four spatial streams. Also, the WLAN technology according to the IEEE 802.11n standard can support a channel bandwidth of up to 40 MHz and can provide a transmission speed of up to 600 Mbps in this case.

With the proliferation of such WLANs and the diversification of applications using WLANs, there is an increasing necessity for new WLAN technology for supporting a higher throughput than a data processing speed of IEEE 802.11n. Very high throughput (VHT) WLAN technology is one of the IEEE 802.11 WLAN technologies proposed to support a data processing speed of 1 Gbps or higher. Among these WLAN technologies, IEEE 802.11ac is being developed as a standard for providing VHT in a 5 GHz or lower band, and IEEE 802.11ad is being developed as a standard for providing VHT in a 60 GHz band. Also, the WLAN technology according to the IEEE 802.11ax standard aims at improving the frequency efficiency in a dense environment.

Since a communication node (e.g., access point (AP), station (STA), etc.) supporting the WLAN technology operates dependent on the battery, a low-power operation method will be needed to operate for a long time. In order to support the low-power operation, the communication node may include a receiver for the low-power operation, a transceiver for basic operations according to the IEEE 802.11, and the like. For example, in a period for waiting reception of a downlink signal, the receiver for the low-power operation may operate in a wake-up state and the transceiver for basic operations may operate in a sleep state.

However, a communication protocol between the receiver for the low-power operation and the transceiver for the basic operations, a communication protocol between the receiver for the low-power operation and another communication node (e.g., a transceiver for basic operations according to the IEEE 802.11 included in another communication node), a communication protocol between the transceiver for the basic operations and another communication node (e.g., a transceiver for basic operations according to the IEEE 802.11 included in another communication node), and the like are not clearly defined. Accordingly, communication performances may be degraded due to transmission and reception failures of frames in the WLAN.

Meanwhile, this description on the related arts is written for understanding of the background of the present disclosure. Thus, information on other than conventional technologies, which are already known to those skilled in this technology domain to which the technologies of the present disclosure belong, may be included in this description.

DISCLOSURE

Technical Problem

The present invention is directed to providing operation methods of a communication node supporting a low-power mode in a wireless LAN.

Technical Solution

In the operation method of an access point according to a first embodiment of the present invention to achieve the above-described purpose, the access point may transmit a CTS frame for protecting transmission of a wake-up packet; transmitting the wake-up packet for waking up a station including a PCR and a WURx, and a transmitting a data frame to the station.

Herein, the wake-up packet may include a legacy preamble and a WUR part, the legacy preamble may include an STF, an LTF, a SIG field, and a BPSK-mark field, and the BPSK-mark field may include an identifier of the station.

Here, the identifier of the station may be AID, WID or GID.

Here, the legacy preamble may be decodable by the PCR, and the WUR part may be decodable by the WURx.

Here, the data frame may be transmitted when a response frame indicating that the station operates in a PCR state is received, and the PCR of the station may operate in a wake-up state in the PCR state.

Here, a duration field included in the CTS frame may indicate a duration from a start time of the CTS frame to an end time of the wake-up packet.

Here, the wake-up packet may be transmitted within an SIFS or an RIFS from an end time of the CTS frame.

Here, the wake-up packet may be transmitted after a period of 'AIFS+backoff interval' from the end time of the CTS frame.

Here, the data frame may be transmitted after a wake-up delay time of the station from the end time of the wake-up packet.

In the operation method of a station according to a second embodiment of the present invention to achieve the above-described purpose, the station may comprise a PCR and a WURx, the PCR may operate in a wake-up state in a PCR state, the PCR may operate in a sleep state in a WUR state, and the PCR may receive a first frame from an access point; transmit to the access point a response frame indicating that the station operates in the normal state in response to the first frame; and receive a data frame from the access point.

Here, the first frame may be a CTS frame for protecting a wake-up packet transmitted from the access point.

Here, a duration field included in the CTS frame may indicate a duration from a start time of the CTS frame to an end time of the wake-up packet.

Herein, the wake-up packet may include a legacy preamble and a WUR part, the legacy preamble may include an STF, an LTF, a SIG field, and a BPSK-mark field, and the BPSK-mark field may include an identifier of the station.

Here, the transmission of the wake-up packet may be omitted when the response frame, which is a response to the CTS frame, is received at the access point.

Here, the first frame may be a null frame requesting to inform the operation mode of the station.

In the operation method of a station according to a third embodiment of the present invention to achieve the above-described purpose, the station may comprise a PCR and a WURx, the PCR may operate in a wake-up state in a PCR state, the PCR may operate in a sleep state in a WUR state, and the PCR may receive from an access point a TIM frame indicating that a data unit to be transmitted to the station is present; transmit a PS-poll frame requesting transmission of the data unit to the access point in response to the TIM frame; and receive a data frame including the data unit from the access point.

Here, the TIM frame may be transmitted from the access point prior to transmission of a wake-up packet for waking up the station, and when the PS-poll frame that is a response to the TIM frame is received at the access point, the transmission of the wake-up packet may be omitted.

Herein, the wake-up packet may include a legacy preamble and a WUR part, the legacy preamble may include an STF, an LTF, a SIG field, and a BPSK-mark field, and the BPSK-mark field may include an identifier of the station.

Here, the legacy preamble may be decodable by the PCR, and the WUR part may be decodable by the WURx.

Here, the PS-poll frame may indicate that the station operates in the PCR state.

Advantageous Effects

According to the present invention, the station may operate in the power-off state (i.e., a primary connectivity radio (PCR): sleep state, a wake-up receiver (WURx): sleep state) according to a wake-up radio (WUR) duty cycle, and thus power consumption at the station can be reduced. Also, when a wake-up packet is periodically transmitted, the access point may notify the stations of the changed transmission cycle of the wake-up packet using a PCR frame (e.g., a power save multi poll (PSMP) frame, a trigger frame, etc.). The station may perform a power saving operation based on the transmission cycle of the wake-up packet configured by the access point.

The access point may also inform the station of a new identifier used for communication with the station and a code value (e.g., a scrambler seed, etc.) used for encryption of all or part of the wake-up packet via the PCR frame, and the security of the communication system can be improved by using the new identifier and the code value.

The PCR frame may include a WUR operation element field, and the WUR operation element field may contain information (e.g., the changed transmission cycle of the wake-up packet, the new identifier, the code value, etc.).

Also, in order to prevent retransmission of the wake-up packet, a WUR poll frame for indicating the operation in the PCR state, a clear-to-send (CTS) frame for protecting the transmission of the wake-up packet, a traffic indication map (TIM) frame for indicating that data to be transmitted to the station is present, a null frame for confirming the operation state of the station, or the like can be used. In this case, the retransmission of the wake-up packet can be prevented, and therefore the performance of the communication system can be improved.

DESCRIPTION OF DRAWINGS

FIG. 9 is a block diagram illustrating a first embodiment of a PSMP frame;

FIG. 10 is a block diagram illustrating a second embodiment of a PSMP frame;

FIG. 17 is a timing diagram illustrating a fifth embodiment of a communication method between an access point and a station in a wireless LAN-based communication system;

FIG. 18 is a timing diagram illustrating a sixth embodiment of a communication method between an access point and a station in a wireless LAN-based communication system;

FIG. 19A is a timing diagram illustrating a first sub-embodiment of a seventh embodiment of a communication method between an access point and a station in a wireless LAN-based communication system;

FIG. 19B is a timing diagram illustrating a second sub-embodiment of a seventh embodiment of a communication method between an access point and a station in a wireless LAN-based communication system;

FIG. 20 is a timing diagram illustrating an eighth embodiment of a communication method between an access point and a station in a wireless LAN-based communication system;

FIG. 21 is a timing diagram illustrating a ninth embodiment of a communication method between an access point and a station in a wireless LAN-based communication system;

FIG. 22 is a timing diagram illustrating a tenth embodiment of a communication method between an access point and a station in a wireless LAN-based communication system;

FIG. 23 is a timing diagram illustrating an eleventh embodiment of a communication method between an access point and a station in a wireless LAN-based communication system;

FIG. 29 is a timing diagram illustrating a fifteenth embodiment of a communication method between an access point and a station in a wireless LAN-based communication system;

FIG. 30 is a timing diagram illustrating a sixteenth embodiment of a communication method between an access point and a station in a wireless LAN-based communication system;

FIG. 31 is a timing diagram illustrating a seventeenth embodiment of a communication method between an access point and a station in a wireless LAN-based communication system;

FIG. 32 is a timing diagram illustrating an eighteenth embodiment of a communication method between an access point and a station in a wireless LAN-based communication system.

MODES OF THE INVENTION

Figure 1:
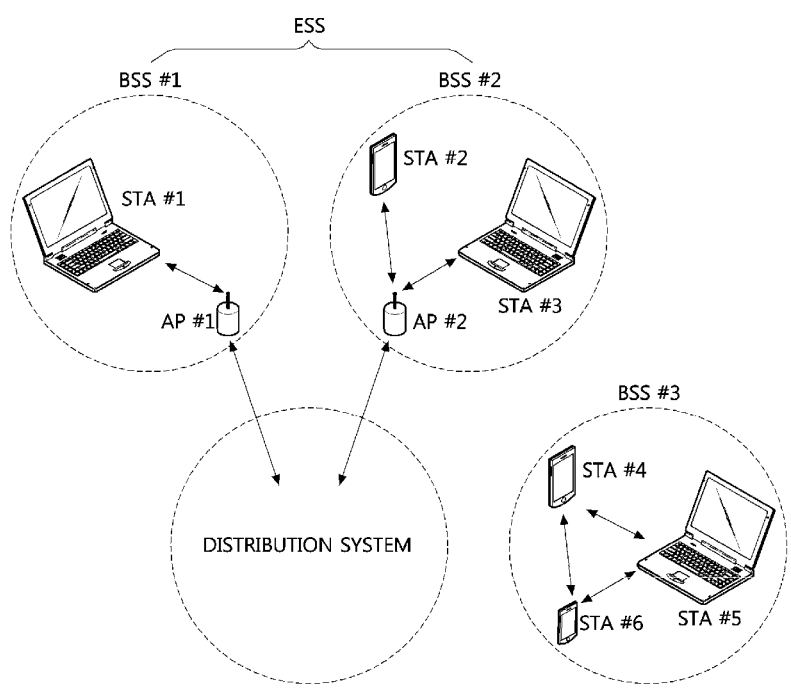
FIG. 1 is a conceptual diagram illustrating a first embodiment of a WLAN based communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

Embodiments described in the present specification may be applied to a communication system (e.g., a wireless local area network (WLAN) based communication system) according to the Institute of Electrical and Electronics Engineers (IEEE) 802.11 standard. Also, the embodiments described in the present specification may be applied to other communication systems as well as the communication systems conforming to the IEEE 802.11 standard. For example, the embodiments described in the present specification may be applied to wireless personal area network (WPAN) based communication systems, wireless body area network (WBAN) based communication systems, 4G communication systems (e.g., long term evolution (LTE) based communication system, LTE-Advanced (LTE-A) based communication system), 5G communication system (e.g., new radio (NR) communication system), or the like.

In the WLAN-based communication system, a station (STA) may refer to a communication node performing functions of a medium access control (MAC) layer and functions of a physical layer on a wireless medium which are defined in the IEEE 802.11 standard. The STA may be classified into an access point (AP) STA and a non-AP STA. The AP STA may simply be referred to as an access point, and the non-AP STA may simply be referred to as a station. Also, the AP may be referred to as a base station (BS), a node B, an evolved node B, a relay, a radio remote head (RRH), a transmission and reception point (TRP), or the like. The station may be referred to as a terminal, a wireless transmit/receive unit (WTRU), a user equipment (UE), a device, or the like and may be a smart phone, a tablet PC, a laptop computer, a sensor device, or the like.

FIG. 1 is a conceptual diagram illustrating a first embodiment of a WLAN based communication system.

Referring to FIG. 1, a WLAN based communication system according to the IEEE 802.11 standard may include at least one basic service set (BSS). The BSS may indicate a set of communication nodes (e.g., APs #1-2, STAs #1-6, etc.). The BSS may be classified into an infrastructure BSS and an independent BSS (IBSS). Here, each of BSSs #1-2 may be an infrastructure BSS, and the BSS #3 may be an IBSS.

The BSS #1 may include a STA #1, an AP #1 connected to a distribution system, and the like. Also, the BSS #1 may further include the distribution system. The communications between the STA #1 and the AP #1 may be performed based on the IEEE 802.11 standard in the BSS #1. The BSS #2 may include a STA #2, a STA #3, an AP #2 connected to a distribution system, and the like. Also, the BSS #2 may further include the distribution system. The communications between the STA #2 and the AP #2, the communications between the STA #3 and the AP #2, and the like may be performed based on the IEEE 802.11 standard in the BSS #2. The communications between STAs (e.g., STAs #1-3) in the BSS #1 or BSS #2 may be performed through the AP (e.g., APs #1-2). However, when a direct link is established between STAs (e.g., STA #1-3), direct communications between the STAs (e.g., STA #1-3) may be performed.

The BSS #3 may be an IBSS operating in an ad-hoc mode. There may not be an AP which is an entity that performs a management function in the BSS #3. In the BSS #3, STAs (e.g., STAs #4-6) may be managed in a distributed manner. The STAs (e.g., STAs #4-6) may form a self-contained network since connections to the distribution system are not allowed in the BSS #3.

The plurality of BSSs (e.g., BSSs #1-2) may be interconnected via the distribution system. The plurality of BSSs connected through the distribution system may be referred to as an extended service set (ESS). The communication nodes (e.g., APs #1-2, STAs #1-3) included in the ESS may communicate with each other, and STAs (e.g., STA #1-3) belonging to the same ESS may move between BSSs (e.g., BSSs #1-2) while performing seamless communications.

The communication node (e.g., AP, STA, etc.) belonging to the WLAN based communication system may be configured as follows.

Figure 2:
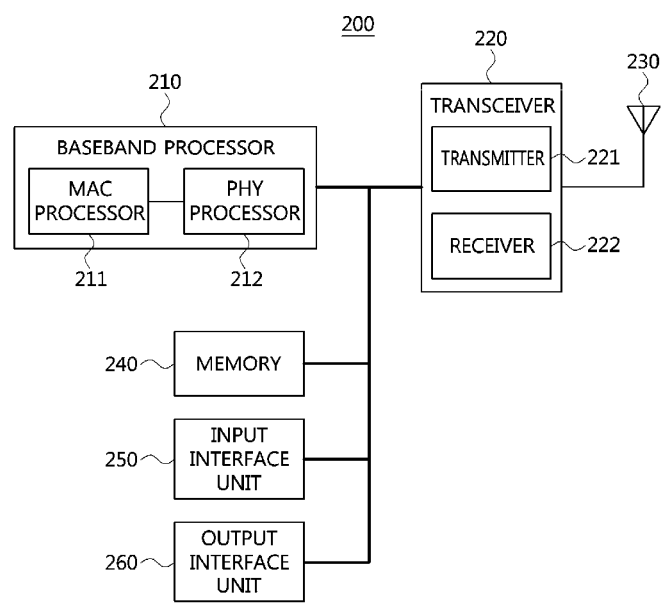
FIG. 2 is a block diagram illustrating a first embodiment of a communication node belonging to a WLAN based communication system.

FIG. 2 is a block diagram illustrating a first embodiment of a communication node belonging to a WLAN based communication system.

Referring to FIG. 2, a communication node 200 may include a baseband processor 210, a transceiver 220, an antenna 230, a memory 240, an input interface unit 250, an output interface unit 260, and the like. The baseband processor 210 may perform baseband-related signal processing, and may include a MAC processor 211 and a PHY processor 212. The MAC processor 211 may perform functions of the MAC layer defined in the IEEE 802.11 standard and the PHY processor 212 may perform functions of the PHY layer defined in the IEEE 802.11 standard.

The transceiver 220 may include a transmitter 221 and a receiver 222. The antenna 230 may be configured as an antenna array to support multiple-input multiple-output (MIMO). The memory 240 may store instructions executed by the baseband processor 210 and may comprise at least one of a read only memory (ROM) and a random access memory (RAM). The input interface unit 250 may obtain information from a user of the communication node 200 and the output interface unit 260 may provide information to the user of the communication node 200. The baseband processor 210, the transceiver 220, the memory 240, the input interface unit 250 and the output interface unit 260 may be connected to each other via a bus.

Meanwhile, the communication node (e.g., AP, STA, etc.) belonging to the WLAN based communication system may perform transmission and reception of a frame based on a point coordination function (PCF), a hybrid coordination function (HCF), a HCF controlled channel access (HCCA) function, an enhanced distributed channel access (EDCA) function, or the like.

In the WLAN based communication system, a frame may be classified into a management frame, a control frame, and a data frame. The management frame may include an association request frame, an association response frame, a reassociation request frame, a reassociation response frame, a probe request frame, a probe response frame, a beacon frame, a disassociation frame, an authentication frame, a deauthentication frame, an action frame, and the like.

The control frame may include an acknowledgment (ACK) frame, a block ACK request (BAR) frame, a block ACK (BA) frame, a power saving (PS)-Poll frame, a request to send (RTS) frame, a clear to send (CTS) frame, and the like. The data frame may be classified into a quality of service (QoS) data frame and a non-QoS data frame. The QoS data frame may indicate a data frame requiring transmission according to the QoS, and the non-QoS data frame may indicate a data frame not requiring transmission according to the QoS.

Figure 3:
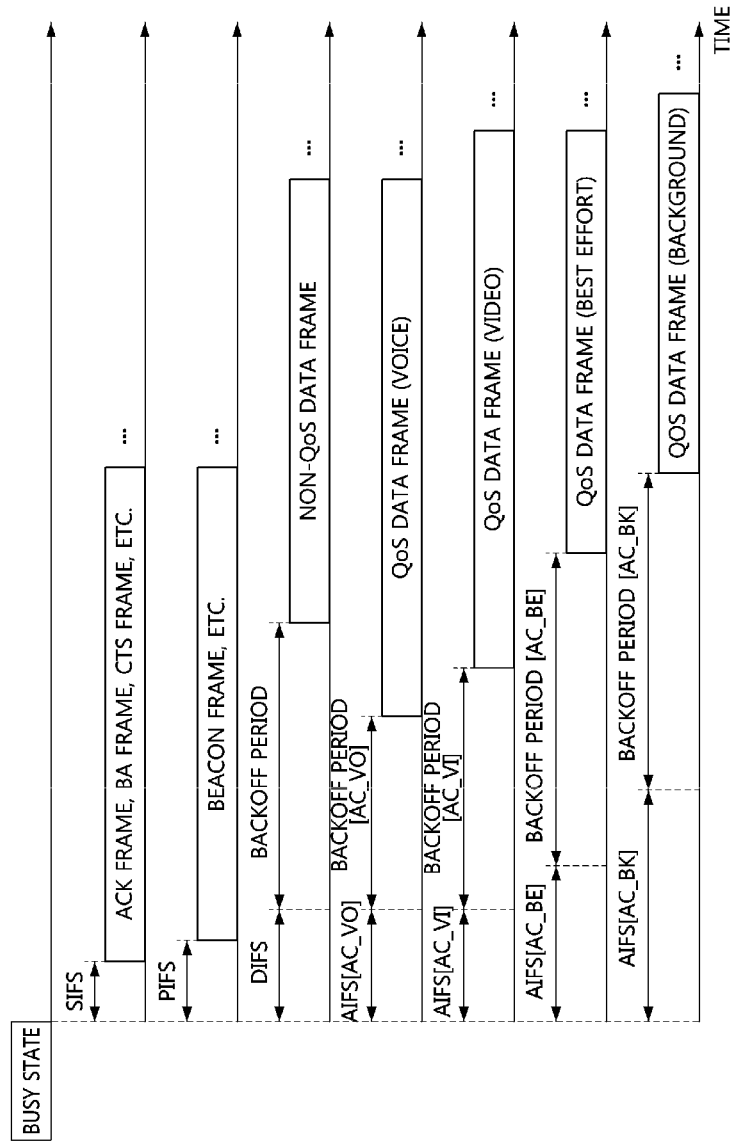
FIG. 3 is a timing diagram illustrating a first embodiment of an operation method of a communication node based on EDCA.

FIG. 3 is a timing diagram illustrating a first embodiment of an operation method of a communication node based on EDCA.

Referring to FIG. 3, a communication node desiring to transmit a control frame (or a management frame) may perform a channel state monitoring operation (e.g., carrier sensing operation) during a predetermined period (e.g., short interframe space (SIFS) or PCF IFS (PIFS)), and when the channel state is determined to be idle during the predetermined period (e.g., SIFS or PIFS), the communication node may transmit the control frame (or the management frame). For example, the communication node may transmit an ACK frame, a BA frame, a CTS frame, or the like when the channel state is determined to be idle during SIFS. Also, the communication node may transmit a beacon frame or the like when the channel state is determined to be idle during the PIFS. On the other hand, when it is determined that the channel state is busy during the predetermined period (e.g., SIFS or PIFS), the communication node may not transmit the control frame (or the management frame). Here, the carrier sensing operation may refer to a clear channel assessment (CCA) operation.

A communication node desiring to transmit a non-QoS data frame may perform a channel state monitoring operation (e.g., carrier sensing operation) during DCF IFS (DIFS), and when the channel state is determined to be idle during the DIFS, the communication node may perform a random backoff procedure. For example, the communication node may select a backoff value (e.g., a backoff counter) within a contention window according to the random backoff procedure and may perform a channel state monitoring operation (e.g., carrier sensing operation) during a period corresponding to the selected backoff value (hereinafter, referred to as 'backoff period'). The communication node may transmit the non-QoS data frame when the channel state is determined to be idle during the backoff period.

A communication node desiring to transmit a QoS data frame may perform a channel state monitoring operation (e.g., carrier sensing operation) during an arbitration IFS (AIFS), and when the channel state is determined to be idle during the AIFS, the communication node may perform a random backoff procedure. The AIFS may be configured according to an access category (AC) of a data unit (e.g., protocol data unit (PDU)) included in the QoS data frame. The AC of the data unit may be as shown in Table 1 below.

TABLE 1

| Priority | AC | Description |
|---|---|---|
| Lowest | AC_BK | Background |
| | AC_BE | Best effort |
| | AC_VI | Video |
| Highest | AC_VO | Voice |

AC_BK may indicate background data, AC_BE may indicate data transmitted in the best effort manner, AC_VI may indicate video data, and AC_VO may indicate voice data. For example, the length of the AIFS for the QoS data frame corresponding to each of AC_VO and AC_VI may be configured to be equal to the length of the DIFS. The length of the AIFS for the QoS data frame corresponding to each of AC_BE and AC_BK may be configured to be longer than the length of the DIFS. Here, the length of the AIFS for the QoS data frame corresponding to AC_BK may be configured to be longer than the length of the AIFS for the QoS data frame corresponding to AC_BE.

In the random backoff procedure, the communication node may select a backoff value (e.g., a backoff counter) within a contention window according to the AC of the QoS data frame. The contention window according to the AC may be as shown in Table 2 below. $CW_{min}$ may indicate a minimum value of the contention window, $CW_{max}$ may indicate a maximum value of the contention window, and each of the minimum value and the maximum value of the contention window may be represented by the number of slots.

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

The communication node may perform a channel state monitoring operation (e.g., carrier sensing operation) during the backoff period and may transmit the QoS data frame when the channel state is determined to be idle during the backoff period.

Figure 4:
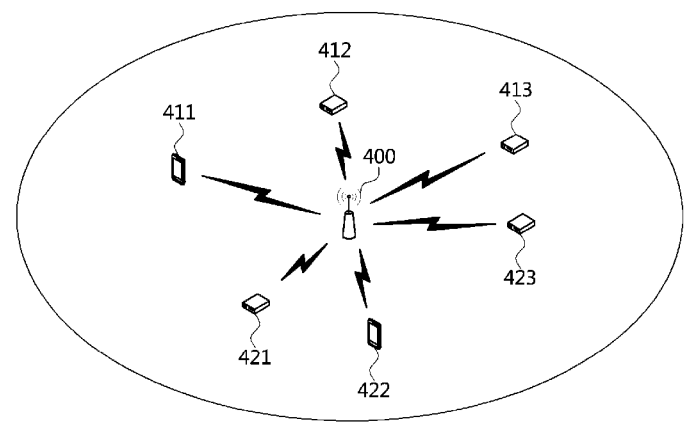
FIG. 4 is a conceptual diagram illustrating a second embodiment of a WLAN based communication system.

FIG. 4 is a conceptual diagram illustrating a second embodiment of a WLAN based communication system.

Referring to FIG. 4, a WLAN based communication system may include an AP 400, STAs supporting a low-power operation (hereinafter referred to as low-power STA') 411, 412 and 413, STAs 421, 422 and 423 which do not support a wake-up radio (WUR) mode (hereinafter referred to as 'legacy STA'), and the like. The low-power STAs 411, 412 and 413 and the legacy STAs 421, 422 and 423 may belong to coverage of the AP 400, and the AP 400 may provide communication services to the low-power STAs 411, 412 and 413 and the legacy STAs 421, 422 and 423. The low-power STA #1 411 and the legacy STA #2 422 may be smart phones, and the low-power STA #2 412, the low-power STA #3 413, the legacy STA #1 421, and the legacy STA #3 423 may be sensor devices.

The AP 400 may support communication protocols used by the low-power STAs 411, 412, and 413 and the legacy STAs 421, 422, and 423, respectively. The low-power STAs 411, 412, and 413 may use communication protocols defined in the IEEE 802.11ba standard. Also, the low-power STAs 411, 412, and 413 may use communication protocols defined in other standards such as IEEE 802.11a/b/g/n/p/ac/ax/ad/ay, etc. as well as the communication protocol defined in the IEEE 802.11ba standard. The legacy STAs 421, 422 and 423 may use the communication protocols defined in standards (e.g., IEEE 802.11a/b/g/n/p/ac/ax/ay, etc.) other than IEEE 802.11ba standard.

The legacy STAs 421, 422 and 423 may be configured the same or similar to the communication node 200 shown in FIG. 2, and the low-power STAs 411, 412 and 413 may be configured as follows.

Figure 5:
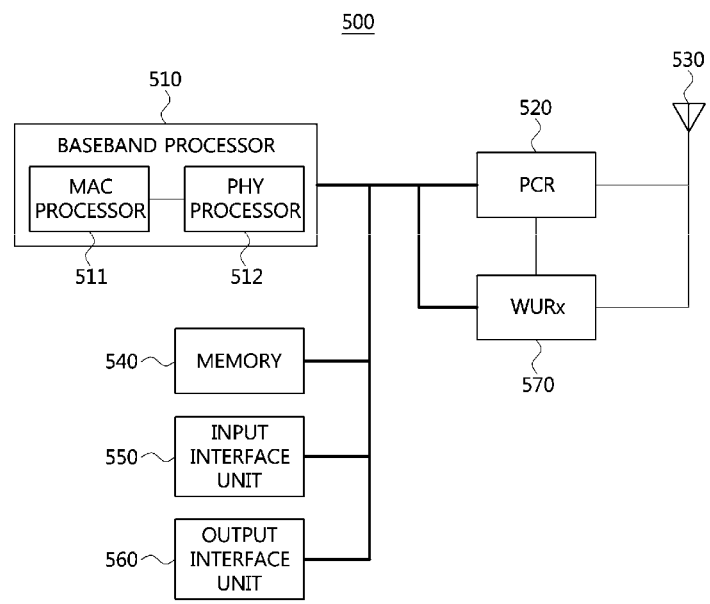
FIG. 5 is a block diagram illustrating a first embodiment of a low-power STA in a WLAN based communication system.

FIG. 5 is a block diagram illustrating a first embodiment of a low-power STA in a WLAN based communication system.

Referring to FIG. 5, a low-power STA 500 may include a baseband processor 510, a primary connectivity radio (PCR) 520, an antenna 530, a memory 540, an input interface unit 550, an output interface unit 560, a wake-up receiver (WURx) 570, and the like. For example, the low-power STA 500 may further include the WURx 570 as compared to the communication node 200 of FIG. 2. The functions of each of the baseband processor 510, the PCR 520, the antenna 530, the memory 540, the input interface unit 550, and the output interface unit 560 included in the low-power STA 500 may be are the same as or similar to the functions of each of the baseband processor 210, the RF transceiver 220, the antenna 230, the memory 240, the input interface unit 250, and the output interface unit 260 included in the communication node 200 of FIG. 2.

The WURx 570 may be located in the PCR 520 or may be configured independently of the PCR 520. The WURx 570 and the PCR 520 may share the same antenna 530.

Alternatively, the antenna for the WURx 570 may be configured separately from the antenna for the PCR 520. For example, the low-power STA 500 may include a first antenna (not shown) for the WURx 570 and a second antenna (not shown) for the PCR 520. The communications between the WURx 570 and the PCR 520 may be performed using a primitive signal, a signal according to an application protocol interface (API), or the like.

The WURx 570 may operate in a narrow band (e.g., 4 MHz, 8 MHz, 16 MHz, etc.) and the power consumption of the low-power STA 500 including the WURx 570 may be less than 1 mW. The WURx 570 may receive an on-off keying (OOK) modulated signal (e.g., a wake-up packet) and perform demodulation on the received signal to verify information included in the received signal. The PCR 520 may transmit and receive frames (e.g., control frames, management frames, data frames) defined in the IEEE 802.11 standard and may operate in at least one of the 2.4 GHz frequency band and the 5 GHz frequency band. Also, the PCR 520 may support 20 MHz bandwidth, 40 MHz bandwidth, 80 MHz bandwidth, 160 MHz bandwidth, or the like.

Each of the PCR 520 and the WURx 570 may operate in a wake-up state or a sleep state. The wake-up state may indicate a state in which power is supplied to the corresponding entity (e.g., PCR 520 or WURx 570), and may be referred to as "on state," "activation state," "enable state," "awake state," or the like. The sleep state may indicate a state in which no power or a minimum power is supplied to the corresponding entity (e.g., PCR 520 or WURx 570), and may be referred to as "off state", "deactivation state", "disable state", "doze state", or the like.

The low-power STA 500 may support two states as shown in Table 3 below.

TABLE 3

|  | PCR | WURx |
|---|---|---|
| PCR state | Wake-up state | Sleep state |
| WUR state | Sleep state | Wake-up state |

In the PCR state, the PCR 520 of the low-power STA 500 may operate in the wake-up state and the WURx 570 of the low-power STA 500 may operate in the sleep state. For example, the PCR 520 operating in the wake-up state may perform transmission and reception procedures of a frame (e.g., a legacy frame, a legacy signal) with another communication node. In the WUR state, the PCR 520 of the low-power STA 500 may operate in the sleep state and the WURx 570 of the low-power STA 500 may operate in the wake-up state. For example, the WURx 570 operating in the wake-up state may perform a channel state monitoring operation (e.g., carrier sensing operation) to receive a wake-up packet. Here, the wake-up packet may request the low-power STA 500 to operate in the PCR state.

When the wake-up packet is received from another communication node, the WURx 570 may transmit to the PCR 520 a wake-up indicator requesting the PCR 520 to operate in the wake-up state. When the wake-up indicator is received from the WURx 570, the operation state of the PCR 520 may transition from the sleep state to the wake-up state. When the wake-up indicator is transmitted to the PCR 520 or when the operation state of the PCR 520 transitions from the sleep state to the wake-up state, the operation state of the WURx 570 may transition from the wake-up state to the sleep state. Alternatively, the operation state of the WURx 570 may transition from the wake-up state to the sleep state when a sleep indicator requesting the WURx 570 to operate in the sleep state is received from the PCR 520. Here, a time required for the transition from the WUR state to the PCR state may be referred to as 'mode transition time'. For example, the mode transition time may indicate a time from the reception of the wake-up packet to a time when the low-power STA starts to operate in the PCR state.

When the operation of frame transmission and reception is completed, the operation state of the PCR 520 may transition from the wake-up state to the sleep state. In this case, the PCR 520 may transmit to the WURx 570 a wake-up indicator requesting the WURx 570 to operate in the wake-up state. When the wake-up indicator is received from the PCR 520, the operation state of the WURx 570 may transition from the sleep state to the wake-up state. When the wake-up indicator is transmitted to the WURx 570 or when the operation state of the WURx 570 transitions from the sleep state to the wake-up state, the operation state of the PCR 520 may transition from the wake-up state to the sleep state.

Also, the baseband processor 510 (e.g., a MAC processor 511 included in the baseband processor 510) may operate in the wake-up state or the sleep state based on the operation state of the PCR 520. For example, the baseband processor 510 (e.g., the MAC processor 511) may also operate in the wake-up state when the PCR 520 operates in the wake-up state, and the baseband processor 510 (e.g., the MAC processor 511) may also operate in the sleep state when the PCR 520 operates in the sleep state. For example, when a wake-up indicator requesting to operate in the wake-up state is received from the PCR 520 operating in the wake-up state, the operation state of the baseband processor 510 (e.g., MAC processor 511) may transition from the sleep state to the wake-up state. When a sleep indicator requesting to operate in the sleep state is received from the PCR 520 to operate in the sleep state, the operation state of the baseband processor 510 (e.g., MAC processor 511) may transition from the wake-up state to the sleep state. Alternatively, the baseband processor 510 may always operate in the wake-up state regardless of the operation state of the PCR 520.

Meanwhile, an AP supporting low-power operations may be configured the same or similar to the low-power STA 500 described above. For example, the AP may include the baseband processor 510, the PCR 520, the antenna 530, the memory 540, the input interface unit 550, the output interface unit 560, the WURx 570, and the like. Also, the AP may include a wake-up transmitter (WUTx) (not shown) instead of the WURx 570, or may include a wake up radio (WUR) that performs the functions of WURx 570 and the WUTx. The WUTx may perform operations corresponding to the WURx 570. For example, WUTx may operate in a narrow band (e.g., 4 MHz, 8 MHz, 16 MHz, etc.). The WUTx may transmit an OOK modulated signal (e.g., the wake-up packet). Also, the low-power STA 500 may further include a WUTx corresponding to the WURx 570. In the below embodiments, the WUR may indicate a 'WURx', a 'WUTx', or an entity performing the functions of the WURx and the WUTx.

Meanwhile, in the WLAN based communication system, a frequency band supported by the PCR of the communication node (e.g., AP, STA) may be 10 MHz, 20 MHz, 40 MHz, 80 MHz, 160 MHz, or the like according to the IEEE 802.11 standard (e.g., IEEE 802.11a/b/g/n/p/ac/ad/ax/ay). Also, in the frequency band supported by the PCR, one channel (CH) may include a plurality of subchannels (SUB-CHs). Here, the number of subchannels and the bandwidth of each subchannel may differ depending on the IEEE 802.11 standard (e.g., IEEE 802.11a/b/g/n/p/ac/ad/ax/ay). For example, in the WLAN based communication system supporting the IEEE 802.11ax standard, a channel having a bandwidth of 20 MHz may include up to 9 subchannels according to the size of a resource unit (RU) allocated to a subchannel.

In a WLAN based low-power communication system, a channel may be configured as follows.

Figure 6:
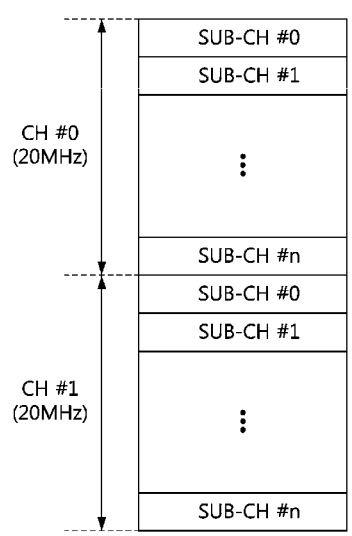
FIG. 6 is a conceptual diagram illustrating a first embodiment of a channel configuration in a WLAN based low-power communication system.

FIG. 6 is a conceptual diagram illustrating a first embodiment of a channel configuration in a WLAN based low-power communication system.

Referring to FIG. 6, a WUR of a communication node (e.g., AP, low-power STA) may support a frequency band of 20 MHz or a frequency band smaller than 20 MHz (e.g., 4 MHz, 8 MHz, 16 MHz, etc.). Also, a channel used by the WUR may comprise a plurality of subchannels, and a bandwidth of each of the plurality of subchannels may be less than the bandwidth supported by the PCR. For example, the 40 MHz frequency band may be comprised of a channel #0 and a channel #1, and when the bandwidth of the subchannel is 4 MHz, each of the channel #0 and the channel #1 may comprise three or four subchannels. Here, a guard band (GB) for protecting each subchannel may be located between the subchannels.

Hereinafter, operation methods of communication nodes (e.g., AP, STA, etc.) supporting low-power operations in a WLAN based communication system will be described. Even when a method (e.g., transmission or reception of a frame) performed at a first communication node among the communication nodes is described, a corresponding second communication node may perform a method (e.g., reception or transmission of the frame) corresponding to the method performed at the first communication node. That is, when an operation of the STA is described, the corresponding AP may perform an operation corresponding to the operation of the STA. Conversely, when an operation of the AP is described, the corresponding STA may perform an operation corresponding to the operation of the AP.

Both the PCR and the WURx included in the communication node may operate in the sleep state for power saving. For example, a 'power-off state' may be defined in addition to the PCR state and the WUR state described in Table 3, and in the power-off state, both the PCR and the WURx included in the communication node may operate in the sleep state. Also, the WURx of the communication node may operate in the sleep state or the wake-up state based on a 'WUR duty cycle'. The WUR duty cycle may be configured as follows.

Figure 7:
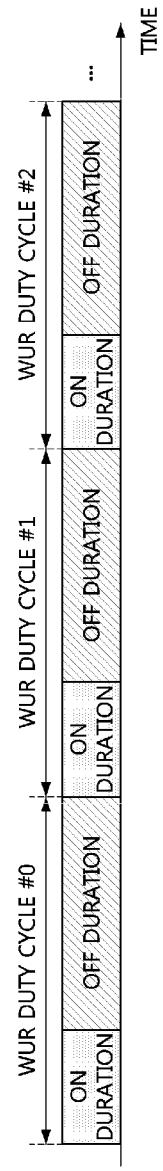
FIG. 7 is a timing diagram illustrating a first embodiment of a WUR duty cycle.

FIG. 7 is a timing diagram illustrating a first embodiment of a WUR duty cycle.

Referring to FIG. 7, the WURx of the communication node may operate in the sleep state or the wake-up state within a WUR duty cycle. For example, the WURx of the communication node may operate in the wake-up state for a predetermined duration (e.g., ON duration) from a start time point of the WUR duty cycle, and may operate in the sleep state for an OFF duration within the WUR duty cycle. That is, the communication node may operate in the WUR state during the ON duration within the WUR duty cycle and may operate in the power-off state during the OFF duration within the WUR duty cycle. A period of the WUR duty cycle may include an ON duration and an OFF duration, and may be set to a multiple of a basic unit. Here, the basic unit may be indicated by the AP. The ON duration within the WUR duty cycle may be set to be equal to or greater than a minimum wake-up duration, and the minimum wake-up duration may be set by the AP.

The WUR duty cycle (e.g., the period of the WUR duty cycle) may be configured or changed through a power save multi poll (PSMP) procedure, a negotiation procedure between communication nodes, and the like. A method of configuring or changing the WUR duty cycle in the PSMP procedure may be as follows.

Method for Configuring or Changing a WUR Duty Cycle in a PSMP Procedure

Figure 8:
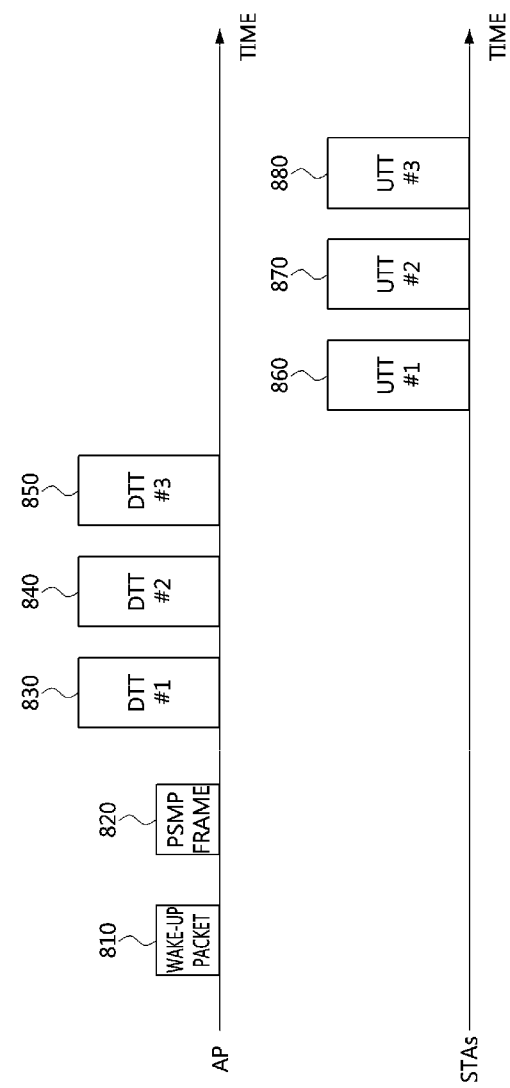
FIG. 8 is a timing chart illustrating a first embodiment of a method of configuring or changing a WUR duty cycle in a WLAN based communication system.

FIG. 8 is a timing chart illustrating a first embodiment of a method of configuring or changing a WUR duty cycle in a WLAN based communication system.

Referring to FIG. 8, a WLAN based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a wake-up packet 810 before transmission of a PSMP frame (820). Here, the wake-up packet 810 may be referred to as a 'wake-up frame', a 'wake-up signal', a 'WUR frame', or the like. The wake-up packet 810 may be transmitted via the PCR or the WUTx included in the AP. The wake-up packet 810 may be transmitted in a broadcast, multicast, or groupcast manner. When the wake-up packet 810 is transmitted in a broadcast manner, the wake-up packet 810 may include a broadcast identifier (BID). The BID may be referred to as a transmission identifier or transmit identifier (TXID). Alternatively, when the wake-up packet 810 is transmitted in a multicast manner, the wake-up packet 810 may include an identifier of each of a plurality of STAs to receive the wake-up packet 810. Alternatively, when the wake-up packet 810 is transmitted in a groupcast manner, the wake-up packet 810 may include a group identifier (GID) indicating a plurality of STAs to receive the wake-up packet 810. The BID and the GID may be set by the AP.

The plurality of STAs may receive the wake-up packet 810 from the AP. When the wake-up packet 810 includes a BID, or when a GID included in the wake-up packet 810 is the same as a GID configured for the plurality of STAs, the operation mode of the plurality of STAs may be transitioned from the WUR state to the PCR state.

The AP may transmit the PSMP frame 820 after a preconfigured time from the end time point of the wake-up packet 810. For example, the AP may transmit the PSMP frame 820 after a time point when the operation mode of the plurality of STAs receiving the wake-up packet 810 are determined to have transitioned from the WUR state to the PCR state. The PSMP frame 820 may be transmitted by the PCR of the AP. The PSMP frame 820 may include information on the WUR duty cycle configured by the AP. For example, the information on the WUR duty cycle may include a period, an ON duration, an OFF duration, a valid period, etc. of the WUR duty cycle. The valid period may indicate a period to which the WUR duty cycle is applied, and may be indicated by the number of WUR duty cycles.

Alternatively, when the period of the WUR duty cycle is preconfigured between the AP and the plurality of STAs, the information on the WUR duty cycle may include a value (hereinafter referred to as an 'adjustment value') for adjusting the preconfigured period. For example, when the period of the WUR duty cycle between the AP and the plurality of STAs is T and the adjustment value indicated by the information on the WUR duty cycle is 2, the period of the WUR duty cycle may be adjusted to 2×T.

When the PSMP frame 820 includes a PSMP group identifier indicating a plurality of STAs participating in the PSMP procedure, the PSMP frame 820 may be configured as follows.

FIG. 9 is a block diagram illustrating a first embodiment of a PSMP frame.

Referring to FIG. 9, the PSMP frame 820 may include a STA information type field 820-11, a PSMP downlink transmission time (PSMP-DTT) start offset field 820-12, a PSMP-DTT duration field 820-13, a PSMP group address ID field 820-14, and a WUR duty cycle field 820-15. The STA information type field 820-11 may have a size of 2 bits and indicate that the PSMP group address ID field 820-14 is included in the PSMP frame 820. For example, the STA information type field 820-11 may be set to '1'. Alternatively, in order to indicate that the PSMP group address ID field 820-14 and the WUR duty cycle field 820-15 are included in the PSMP frame 820, the STA information type field 820-11 may be set to '0' or '3'.

The PSMP-DTT start offset field 820-12 may have a size of 11 bits and may indicate a start offset of a DTT (e.g., DTTs #1 to #3 830 to 850). The PSMP-DTT duration field 820-13 may have a size of 8 bits and may indicate a duration of a DTT (e.g., DTTs #1 to #3 830 to 850). The PSMP group address ID field 820-14 may have a size of 37 bits and may indicate a group identifier of a plurality of STAs participating in the PSMP procedure. The PSMP group address ID field 820-14 in the PSMP frame 820 that does not include the WUR duty cycle field 820-15 may have a size of 43 bits. However, when the PSMP frame 820 includes the WUR duty cycle field 820-15, the size of the PSMP group address ID field 820-14 may be reduced from 43 bits to 37 bits, and the remaining 6 bits may be used for the WUR duty cycle field 820-15.

The WUR duty cycle field 820-15 may have a size of 6 bits and may indicate a period, an ON duration, an OFF duration, a valid period of the WUR duty cycle, an adjustment value, etc. of the WUR duty cycle. The information indicated by the WUR duty cycle field 820-15 may be applied to STAs indicated by the PSMP group address ID field 820-14.

On the other hand, when the PSMP frame 820 includes an identifier of an individual STA participating in the PSMP procedure, the PSMP frame 820 may be configured as follows.

FIG. 10 is a block diagram illustrating a second embodiment of a PSMP frame. Referring to FIG. 10, the PSMP frame 820 may include a STA information type field 820-21, a PSMP-DTT start offset field 820-22, a PSMP-DTT duration field 820-23, a STA ID field 820-24, a PSMP uplink transmission time (PSMP-UTT) start offset field 820-25, a PSMP-UTT duration field 820-26, and a WUR duty cycle field 820-27. The STA information type field 820-21 may have a size of 2 bits and indicate that the STA ID field 820-24 is included in the PSMP frame 820. For example, the STA information type field 820-21 may be set to '2'.

The PSMP-DTT start offset field 820-22 may have a size of 11 bits and may indicate a start offset of a DTT (e.g., DTTs #1 to #3 830 to 850). The PSMP-DTT duration field 820-23 may have a size of 8 bits and may indicate a duration of a DTT (e.g., DTTs #1 to #3 830 to 850). The STA ID field 820-24 may have a size of 16 bits and may indicate an identifier of a STA participating in the PSMP procedure. The PSMP-UTT start offset field 820-25 may have a size of 11 bits and may indicate a start offset of a UTT (e.g., UTTs #1 to #3 860 to 880). The PSMP-UTT duration field 820-26 may have a size of 10 bits and may indicate a duration of a UTT (e.g., UTTs #1 to #3 860 to 880).

A reserved field in the PSMP frame 820 may be configured as the WUR duty cycle field 820-27. The WUR duty cycle field 820-27 may have a size of 6 bits and may indicate a period, an ON duration, an OFF duration, a valid period, adjustment value, etc. of the WUR duty cycle. The information indicated by the WUR duty cycle field 820-27 may be applied to the STA indicated by the STA ID field 820-24.

Referring again to FIG. 8, a plurality of STAs operating in the PCR state may receive the PSMP frame 820 from the AP and confirm the information included in the PSMP frame 820. For example, the plurality of STAs may identify the STA participating in the PSMP procedure, the start offset and duration of the DTT, the start offset and duration of the UTT, and the like. Further, the plurality of STAs may confirm the information on the WUR duty cycle based on the WUR duty cycle field 820-15 or 820-27. Accordingly, the WURx of each of the plurality of STAs may operate in the wake-up state or the sleep state based on the information on the WUR duty cycle indicated by the PSMP frame 820 after the PSMP procedure is terminated. For example, a STA that completed uplink data transmission in the PSMP procedure may operate based on the information on the WUR duty cycle indicated by the PSMP frame 820. Also, among the STAs that have completed downlink data reception in the PSMP procedure, the STA having no uplink data may operate based on the information on the WUR duty cycle indicated by the PSMP frame 820 after completion of the downlink data reception.

Meanwhile, the plurality of STAs may transmit an ACK frame for the PSMP frame 820 to the AP. The ACK frame for the PSMP frame 820 may indicate that the plurality of STAs acknowledge the information on the WUR duty cycle indicated by the PSMP frame 820 (e.g., accepting use of the information on the WUR duty cycle). The ACK frame for the PSMP frame 820 may be transmitted in a UTT (e.g., UTTs #1 to #3 860 to 880) configured for the plurality of STAs. The AP may receive the ACK frame from the plurality of STAs in the UTT (e.g., UTT #1 to #3 860 to 880), and determine that the PSMP frame 820 has been successfully received at the plurality of STAs based on the ACK frame. In addition, the AP may determine that the information on the WUR duty cycle indicated by the PSMP frame 820 is used in the plurality of STAs based on the ACK frame. If an STA rejects application of the WUR duty cycle indicated by the PSMP frame 820, the corresponding STA may not transmit the ACK frame for the PSMP frame 820 to the AP.

Alternatively, when a specific time period within a DTT (e.g., DTTs #1 to #3 830 to 850) is used for uplink data transmission by a trigger frame, the plurality of STAs may transmit the ACK frame for the PSMP frame 820 to the AP in the specific time period indicated by the trigger frame within the DTT (e.g., DTTs #1 to #3 830 to 850). For example, uplink data transmission by a trigger frame in the DTT #1 830 may be performed as follows.

Figure 11:
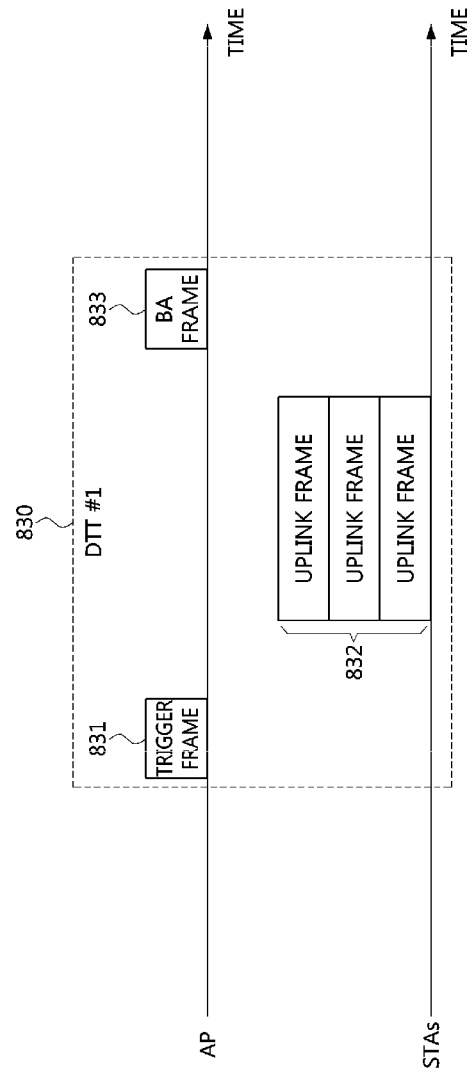
FIG. 11 is a timing chart illustrating a first embodiment of an uplink transmission method in a WLAN based communication system.

FIG. 11 is a timing chart illustrating a first embodiment of an uplink transmission method in a WLAN based communication system.

Referring to FIG. 11, the AP may transmit a trigger frame 831 for triggering uplink data transmission in the DTT #1 830. The trigger frame 831 may indicate an identifier of a STA participating in the uplink data transmission procedure, information on a resource allocated for the uplink data transmission, and the like. A plurality of STAs may receive the trigger frame 831 in the DTT #1 830 and may transmit uplink frames 832 using the resource indicated by the trigger frame 831. Here, the uplink frames 832 may be ACK frames for the PSMP frame 820. If a STA rejects application of the WUR duty cycle indicated by the PSMP frame 820, the corresponding STA may not transmit the ACK frame for the PSMP frame 820 to the AP.

The AP may receive the ACK frames (e.g., the uplink frames 832) from a plurality of STAs in the DTT #1 830, and may determine that the PSMP frame has been successfully received at the plurality of STAs. Also, the AP may transmit a BA frame 833 for the uplink frames 832 to the plurality of STAs.

WUR Duty Cycle Negotiation Method

Meanwhile, the WUR duty cycle may be configured or changed through negotiation between the AP and the STA.

Figure 12:
FIG. 12 is a timing chart illustrating a first embodiment of a WUR duty cycle negotiation method in a WLAN based communication system.

FIG. 12 is a timing chart illustrating a first embodiment of a WUR duty cycle negotiation method in a WLAN based communication system.

Referring to FIG. 12, a WLAN based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The STA may generate a WUR request frame 1210 requesting configuration or changing of the WUR duty cycle when the following event occurs. The WUR request frame 1210 may be an action frame.

Event #1: A case that the STA wishes to set the WUR duty cycle with the AP (i.e., the initial configuration of the WUR duty cycle)

Event #2: A case that the STA wishes to change the WUR duty cycle configured between the STA and the AP (i.e., reconfiguration of the WUR duty cycle)

The WUR request frame 1210 may include a period, an ON duration, an OFF duration, a valid period, an adjustment value, etc. of a WUR duty cycle required by the STA. The STA may transmit the WUR request frame 1210 to the AP. The AP may receive the WUR request frame 1210 from the STA, and confirm the information included in the WUR request frame 1210. When the WUR duty cycle required by the STA is acceptable, the AP may transmit a WUR response frame 1220 instructing to operate based on the information indicated by the WUR request frame 1210 to the STA. Also, the WUR response frame 1220 may include the same information as the information included in the WUR request frame 1210. Here, the WUR response frame 1220 may be an action frame. On the other hand, if the WUR duty cycle required by the STA is unacceptable, the AP may transmit the WUR response frame 1220 including information on an allowable WUR duty cycle to the STA. Here, the WUR response frame 1220 may indicate that the WUR duty cycle required by the STA is unacceptable.

The STA may receive the WUR response frame 1220 from the AP. When the WUR response frame 1220 indicates that the WUR duty cycle required by the STA is acceptable, the STA may operate according to the WUR duty cycle configured by the STA from the end time point of the WUR response frame 1220. On the other hand, when the WUR response frame 1220 indicates that the WUR duty cycle required by the STA is unacceptable, the STA may operate according to the WUR duty cycle indicated by the WUR response frame 1220 from the end time point of the WUR response frame 1220.

Method for Changing a Wake-Up Packet Transmission Cycle

When a wake-up packet is transmitted based on a pre-configured transmission cycle, the AP may change the transmission cycle of the wake-up packet as needed. The transmission cycle of the wake-up packet may be changed based on the PSMP frame 820 described in the embodiments of FIGS. 8 to 11.

For example, the AP may transmit the PSMP frame 820 that includes a changed transmission cycle of the wake-up packet 810 after transmission of the wake-up packet 810. In this case, the WUR duty cycle field 820-15 of the PSMP frame 820 of FIG. 9 or the WUR duty cycle field 820-27 of the PSMP frame 820 of FIG. 10 may indicate the changed transmission cycle. The STAs receiving the PSMP frame 820 may identify the changed transmission cycle of the wake-up packet indicated by the WUR duty cycle field 820-15 or the WUR duty cycle field 820-27 included in the PSMP frame 820. After the PSMP procedure is terminated, the AP may transmit the wake-up packet according to the changed transmission cycle, and the STAs may monitor a channel according to the changed transmission cycle to receive the wake-up packet 810.

Alternatively, the transmission cycle of the wake-up packet may be changed based on a separate PCR frame (e.g., trigger frame) instead of the PSMP frame. Here, the PCR frame may be a frame transmitted and received through the PCR of the STA.

For example, the AP may transmit a PCR frame (e.g., trigger frame) including the changed transmission cycle of the wake-up packet after transmission of the wake-up packet. Alternatively, the PCR frame (e.g., trigger frame) may be transmitted regardless of the transmission of the wake-up packet. The PCR frame (e.g., trigger frame) may include a WUR operation element field, and the changed transmission cycle of the wake-up packet may be indicated by the WUR operation element field.

The STAs that have received the PCR frame (e.g., trigger frame) may identify the changed transmission cycle of the wake-up packet indicated by the WUR operation element field included in the PCR frame (e.g., trigger frame). Thereafter, the AP may transmit the wake-up packet according to the changed transmission cycle, and the STAs may monitor a channel according to the changed transmission cycle to receive the wake-up packet.

Method for Improving Security Using PSMP Frame

The wake-up packet may include an identifier of a STA (e.g., address of the STA), and the identifier of the STA may be exposed if the identifier of the STA is not encrypted. Alternatively, in the case that the identifier of the STA is encrypted in the same manner, if an arbitrary communication node retransmits a duplicated wake-up packet, the operation mode of the STA receiving the duplicated wake-up packet may be transitioned from the WUR state to the PCR state. Therefore, a method for solving this problem is needed.

For example, the AP may configure a new identifier for the STA, and inform the STA of the new identifier via the PSMP frame 820. That is, the AP may transmit the PSMP frame 820 including the new identifier for the STA after transmission of the wake-up packet 810. In this case, the WUR duty cycle field 820-15 of the PSMP frame 820 of FIG. 9 or the WUR duty cycle field 820-27 of the PSMP frame 820 of FIG. 10 may indicate the new identifier. The STA receiving the PSMP frame 820 may identify the new identifier indicated by the WUR duty cycle field 820-15 or the WUR duty cycle field 820-27 included in the PSMP frame 820. The STA may transmit a frame indicating that the use of the new identifier is approved in a DTT or a UTT scheduled by the PSMP frame 820 when using the new identifier. In this case, after the PSMP procedure is completed, the STA and the AP may perform communications using the new identifier.

Alternatively, the WUR duty cycle field 820-15 of the PSMP frame 820 of FIG. 9 or the WUR duty cycle field 820-27 of the PSMP frame 820 of FIG. 10 may indicate a code value (e.g., a scrambler seed, etc.) used for encryption of all or part of the wake-up packet instead of the new identifier. In this case, after the PSMP procedure is terminated, the AP may generate a wake-up packet using the code value indicated by the PSMP frame 820, and transmit the generated wake-up packet to the STA. The STA may receive the wake-up packet from the AP, and interpret the wake-up packet using the code value indicated by the PSMP frame 820.

Alternatively, the WUR duty cycle field 820-15 of the PSMP frame 820 of FIG. 9 or the WUR duty cycle field 820-27 of the PSMP frame 820 of FIG. 10 may indicate a minimum wake-up duration (e.g., a minimum size of an ON duration shown in FIG. 7) instead of the new identifier.

Meanwhile, in the embodiments described above, it has been described that the transmission cycle of the wake-up packet, the new identifier of the STA, the code value of the wake-up packet, and the minimum wake-up duration are transmitted through the PSMP frame 820. However, the transmission cycle of the wake-up packet, the new identifier of the STA, the code value of the wake-up packet, and the minimum wake-up duration may be transmitted through the PCR frame transmitted after the wake-up packet 810 instead of the PSMP frame 820. Alternatively, the PCR frame may be transmitted regardless of the transmission of the wake-up packet 810. The PCR frame may be a frame (e.g., a trigger frame, a PSMP frame, an action frame, etc.) that can be transmitted and received through the PCR of the STA. The PCR frame may include a WUR operation element field, and the WUR operation element field may include at least one of the transmission cycle of the wake-up packet, the new identifier of the STA, the code value of the wake-up packet, and the minimum wake-up duration. The PCR frame may be transmitted in a multicast manner, a groupcast manner, or a broadcast manner.

For example, at least one of the transmission cycle of the wake-up packet, the new identifier of the STA, the code value of the wake-up packet, and the minimum wake-up duration may be transmitted through the PCR frame. When at least one of the transmission cycle of the wake-up packet, the new identifier of the STA, the code value of the wake-up packet, and the minimum wake-up duration is applied to each of the STAs, at least one of the transmission cycle of the wake-up packet, the new identifier of the STA, the code value of the wake-up packet, and the minimum wake-up duration may be included in the STA information field of the PCR frame (e.g., the WUR operation element field included in the STA information field of the PCR frame). Alternatively, when at least one of the transmission cycle of the wake-up packet, the new identifier of the STA, the code value of the wake-up packet, and the minimum wake-up duration is commonly applied to the STAs, at least one of the transmission cycle of the wake-up packet, the new identifier of the STA, the code value of the wake-up packet, and the minimum wake-up duration may be included in the common information field of the PCR frame (e.g., the WUR operation element field included in the common information field of the PCR frame).

The STA may identify at least one of the transmission cycle of the wake-up packet, the new identifier of the STA, the code value of the wake-up packet, and the minimum wake-up duration by receiving the PCR frame after the wake-up packet, and when the identified information can be used, the STA may transmit to the AP a response frame (i.e., a response frame for the PCR frame) including information indicating that the information indicated by the PCR frame is accepted.

Method for Preventing Transmission Delay Due to Retransmission of Wake-Up Packet In the WLAN based communication system, the AP may transmit a data frame to the STA after transmitting the wake-up packet. When it is determined that the operation mode of the STA has not transitioned from the WUR state to the PCR state, the AP may retransmit the wake-up packet. In this case, the transmission of the data frame may be delayed by the retransmission of the wake-up packet. Hereinafter, embodiments for preventing the transmission delay due to the retransmission of the wake-up packet will be described.

Figure 13:
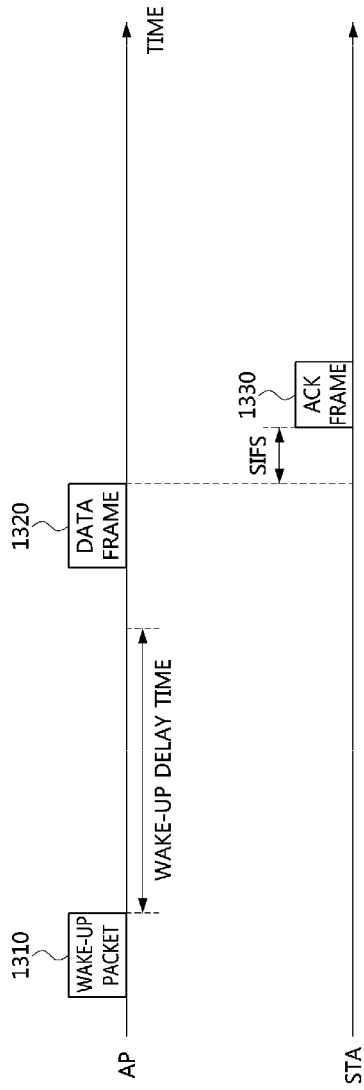
FIG. 13 is a timing diagram illustrating a first embodiment of a communication method between an access point and a station in a wireless LAN-based communication system.

FIG. 13 is a timing diagram illustrating a first embodiment of a communication method between an access point and a station in a wireless LAN-based communication system.

Referring to FIG. 13, a WLAN based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a wake-up packet 1310. For example, the wake-up packet 1310 may be transmitted when a channel is idle for a period of 'AIFS+backoff interval'. The AP may transmit a data frame 1320 to the STA after a wake-up delay time from the end time point of the wake-up packet 1310. The data frame 1320 may be transmitted when the channel is idle for the period of 'AIFS+backoff interval'. Here, the wake-up delay time may be longer than a time required for the operation mode of the STA receiving the wake-up packet 1310 to transition from the WUR state to the PCR state. That is, the AP may determine that the STA operates in the PCR state after the wake-up delay time from the end time point of the wake-up packet 1310.

The WURx of the STA may receive the wake-up packet 1310 from the AP, and wake up the PCR when an identifier indicated by the wake-up packet 1310 is identical to the identifier of the STA. That is, when the wake-up packet 1310 is received from the AP, the operation mode of the STA may transition from the WUR state to the PCR state. The STA operating in the PCR state may receive the data frame 1320 from the AP. When the data frame 1320 is successfully received, the station may transmit an ACK frame 1330 to the AP within an SIFS from the end time point of the data frame 1320. When the ACK frame 1330 is received from the STA, the AP may determine that the data frame 1320 has been successfully received at the STA.

Meanwhile, in the WLAN based communication system, the STA operating in the PCR state after receiving the wake-up packet may transmit a WUR poll frame indicating that the STA has transitioned from the WUR state to the PCR state to the AP. The WUR poll frame may be transmitted by the PCR of the STA. Whether or not the WUR poll frame is used may be determined in an association procedure between the STA and the AP or a negotiation procedure for supporting the WUR state between the STA and the AP. Alternatively, whether or not the WUR poll frame is used may be indicated by the wake-up packet. A method of transmitting and receiving a data frame when the WUR poll frame is used may be as follows.

Figure 14:
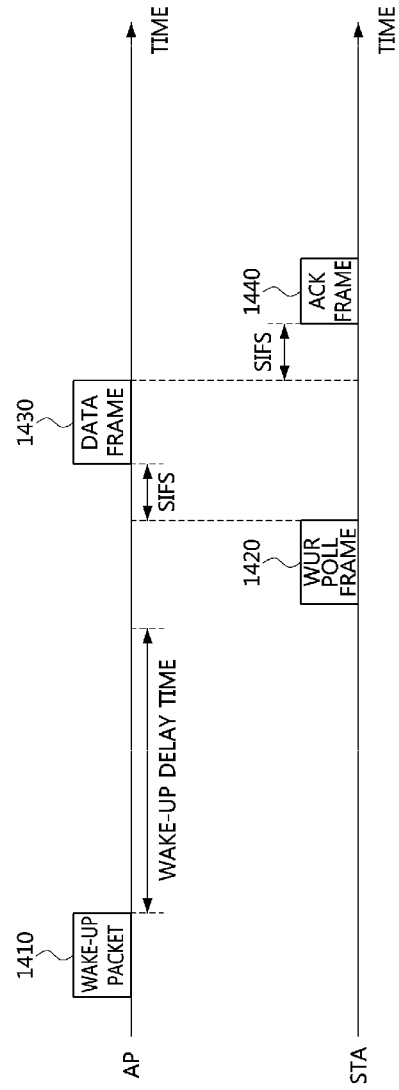
FIG. 14 is a timing diagram illustrating a second embodiment of a communication method between an access point and a station in a wireless LAN-based communication system.

FIG. 14 is a timing diagram illustrating a second embodiment of a communication method between an access point and a station in a wireless LAN-based communication system.

Referring to FIG. 14, a WLAN based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a wake-up packet 1410. For example, the wake-up packet 1410 may be transmitted when a channel is idle for a period of 'AIFS+backoff interval'. When a WUR poll frame 1420 is determined to be used in the association procedure or the negotiation procedure for supporting the WUR state, or when the wake-up packet 1410 indicates transmission of the WUR poll frame 1420, the AP may monitor the channel to receive the WUR poll frame 1420 which is the response to the wake-up packet 1410 without transmission of a data frame 1430.

The WURx of the STA may receive the wake-up packet 1410 from the AP, and wake up the PCR when an identifier indicated by the wake-up packet 1410 is identical to the identifier of the STA. That is, when the wake-up packet 1410 is received from the AP, the operation mode of the STA may transition from the WUR state to the PCR state. The STA operating in the PCR state may transmit the WUR poll frame 1420 which is the response to the wake-up packet 1410 to the AP. The WUR poll frame 1420 may be transmitted by the PCR of the STA, and may be transmitted when the channel is idle for the period of 'AIFS+backoff interval'. Also, when the WUR poll frame 1420 is determined to be used in the association procedure or the negotiation procedure for supporting the WUR state, or when the wake-up packet 1410 indicates the transmission of the WUR poll frame 1420, the STA may transmit the WUR poll frame 1420.

The AP may receive the WUR poll frame 1420 from the STA, and determine that the operation mode of the STA has transitioned from the WUR state to the PCR state based on the WUR poll frame 1420. Here, the WUR poll frame 1420 may be received within a preconfigured timeout period or the wake-up delay time from the end time point of the wake-up packet 1410. The timeout period may be equal to or greater than 'wake-up delay time+the time required for the transmission of the WUR poll frame 1420 (e.g., 'AIFS+backoff interval')'. The AP may transmit the data frame 1430 to the STA within an SIFS from the end time point of the WUR poll frame 1420. Alternatively, the AP may transmit to the STA an ACK frame indicating that the WUR poll frame 1420 has been successfully received. When there is data to be transmitted to the STA after the transmission of the ACK frame, the AP may transmit the data frame 1430 including the data to the STA.

The STA may receive the data frame 1430 from the AP. When the data frame 1430 is successfully received, the STA may transmit an ACK frame 1440 to the AP within an SIFS from the end time point of the data frame 1430. When the ACK frame 1440 is received from the STA, the AP may determine that the data frame 1430 has been successfully received at the STA.

Meanwhile, in the WLAN based communication system that does not support the use of the WUR poll frame 1420, when the AP does not receive the ACK frame for the data frame transmitted after the transmission of the wake-up packet from the STA, the AP may retransmit the wake-up packet. The retransmission procedure of the wake-up packet may be performed as follows.

Figure 15:
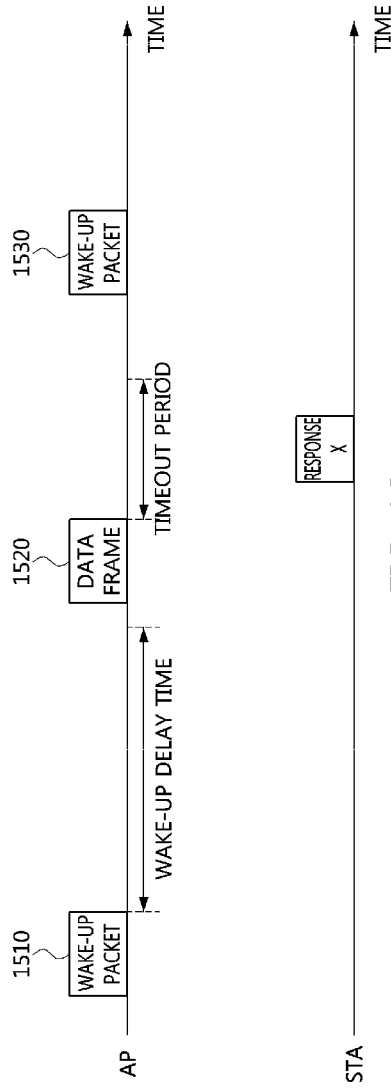
FIG. 15 is a timing diagram illustrating a third embodiment of a communication method between an access point and a station in a wireless LAN-based communication system.

FIG. 15 is a timing diagram illustrating a third embodiment of a communication method between an access point and a station in a wireless LAN-based communication system.

Referring to FIG. 15, a WLAN based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a wake-up packet 1510. For example, the wake-up packet 1510 may be transmitted when a channel is idle for a period of 'AIFS+backoff interval'. The AP may transmit a data frame 1520 to the STA after the wake-up delay time from the end time point of the wake-up packet 1510. The data frame 1520 may be transmitted when the channel is idle for the period of 'AIFS+backoff interval'. Here, the wake-up delay time may be longer than a time required for the operation mode of the STA receiving the wake-up packet 1510 to transition from the WUR state to the PCR state. That is, the AP may determine that the STA operates in the PCR state after the wake-up delay time from the end time point of the wake-up packet 1510.

When an ACK frame for the data frame 1520 is not received from the STA within a preconfigured timeout period from the end time point of the data frame 1520, since the AP does not know which signal has not been successfully received at the STA (e.g., the wake-up packet 1510 or the data frame 1520), the AP may perform the transmission procedure of a wake-up packet 1530 again. For example, the AP may retransmit the wake-up packet 1530 when the channel is idle for the period of 'AIFS+backoff interval' after a lapse of the timeout period. Here, the timeout period may equal to or longer than an SIFS.

Meanwhile, when the STA fails to receive the wake-up packet 1510 or fails to receive the data frame 1520, the STA may not transmit an ACK frame for the data frame 1520 to the AP. On the side of the STA that has not received the wake-up packet 1510, power consumption may not be a problem since the STA continues to operate in the WUR state. However, since the STA operates in the PCR state after the reception of the wake-up packet 1510, on the side of the STA receiving the wake-up packet 1510 but not receiving the data frame 1520, unnecessary power may be consumed according to the retransmission procedure of the wake-up packet 1530 performed by the AP.

Meanwhile, in the WLAN based communication system supporting the use of the WUR poll frame, the AP may retransmit the wake-up packet when the WUR poll frame is not received from the STA after transmission of the wake-up packet. The retransmission procedure of the wake-up packet may be performed as follows.

Figure 16:
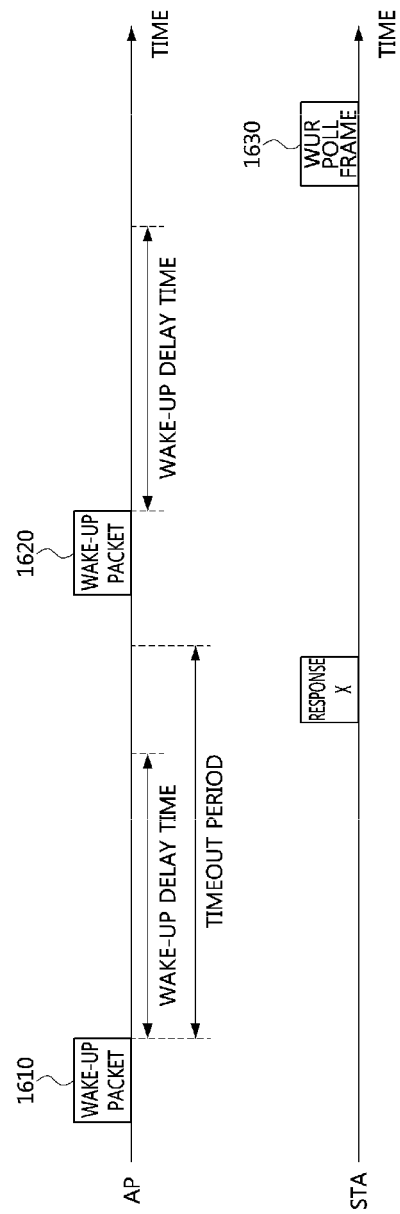
FIG. 16 is a timing diagram illustrating a fourth embodiment of a communication method between an access point and a station in a wireless LAN-based communication system.

FIG. 16 is a timing diagram illustrating a fourth embodiment of a communication method between an access point and a station in a wireless LAN-based communication system.

Referring to FIG. 16, a WLAN-based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a wake-up packet 1610. For example, the wake-up packet 1610 may be transmitted when a channel is idle for a period of 'AIFS+backoff interval'. When the WUR poll frame is determined to be used in the association procedure or the negotiation procedure for supporting the WUR state, or when the wake-up packet 1610 indicates the transmission of the WUR poll frame, the AP may monitor the channel to receive the WUR poll frame which is the response to the wake-up packet 1610 without transmitting a data frame.

Meanwhile, since the operation mode of the STA that has not received the wake-up packet 1610 is maintained in the WUR state, the STA operating in the WUR state may not transmit the WUR poll frame which is the response to the wake-up packet 1610 to the AP. When the WUR poll frame, which is the response to the wake-up packet 1610, is not received within a preconfigured timeout period from the end time point of the wake-up packet 1610, the AP may determine that the operation mode of the STA has not transitioned to the PCR state. Here, the timeout period may be equal to or greater than 'wake-up delay time+the time required for the transmission of the WUR poll frame (e.g., 'AIFS+ backoff interval')'. When the WUR poll frame, which is the response to the wake-up packet 1610, is not received from the STA, the AP may retransmit a wake-up packet 1620. For example, the AP may transmit the wake-up packet 1620 when the channel is idle for the period of 'AIFS+backoff interval'.

When the wake-up packet 1620 is received from the AP, the WURx of the STA may wake up the PCR when an identifier indicated by the wake-up packet 1620 is identical to the identifier of the STA. That is, the operation mode of the STA having received the wake-up packet 1620 may transition from the WUR state to the PCR state. The STA operating in the PCR state may transmit the WUR poll frame 1630 which is the response to the wake-up packet 1620 to the AP. The WUR poll frame 1630 may be transmitted by the PCR of the STA, and may be transmitted when the channel is idle for the period of 'AIFS+backoff interval'. Also, when the WUR poll frame 1630 is determined to be used in the association procedure or the negotiation procedure for supporting the WUR state, or when the wake-up packet 1620 indicates the transmission of the WUR poll frame 1630, the STA may transmit the WUR poll frame 1630.

The AP may receive the WUR poll frame 1630 from the STA, and determine that the operation mode of the STA has transitioned from the WUR state to the PCR state based on the WUR poll frame 1630. Here, the WUR poll frame 1630 may be received within a preconfigured timeout period or the wake-up delay time from the end time point of the wake-up packet 1620. The AP may transmit a data frame to the STA within an SIFS from the end time point of the WUR poll frame 1630.

Meanwhile, in the WLAN based communication system that does not support the use of the WUR poll frame, when the AP fails to receive an ACK frame for the data frame transmitted after the transmission of the wake-up packet from the STA, the AP may transmit to the STA a frame for identifying a state (e.g., operation mode) of the STA. The transmission procedure of the frame for identifying the operation mode of the STA may be performed as follows.

FIG. 17 is a timing diagram illustrating a fifth embodiment of a communication method between an access point and a station in a wireless LAN-based communication system.

Referring to FIG. 17, a WLAN based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a wake-up packet 1710. For example, the wake-up packet 1710 may be transmitted when a channel is idle for a period of 'AIFS+backoff interval'. The AP may transmit a data frame 1720 to the STA after a wake-up delay time from the end time point of the wake-up packet 1710. The data frame 1720 may be transmitted when the channel is idle for the period of 'AIFS+backoff interval'. Here, the wake-up delay time may be longer than a time required for the operation mode of the STA receiving the wake-up packet 1710 to transition from the WUR state to the PCR state. That is, the AP may determine that the STA operates in the PCR state after the wake-up delay time from the end time point of the wake-up packet 1710.

The WURx of the STA may receive the wake-up packet 1710 from the AP, and wake up the PCR when an identifier indicated by the wake-up packet 1710 is identical to the identifier of the STA. That is, when the wake-up packet 1710 is received from the AP, the operation mode of the STA may transition from the WUR state to the PCR state. The STA operating in the PCR state may monitor the channel to receive the data frame 1720 from the AP. However, when the data frame 1720 collides with a frame transmitted from another communication node, the STA may not receive the data frame 1720, and accordingly the STA may not transmit an ACK frame for the data frame 1720 to the AP.

The AP may monitor the channel to receive an ACK frame that is a response to the data frame 1720 after the transmission of the data frame 1720. When an ACK frame for the data frame 1720 is not received from the STA within a preconfigured timeout period from the end time point of the data frame 1720, the AP may determine that the wake-up packet 1710 or the data frame 1720 has not been successfully received at the STA. Here, the timeout period may be equal to or longer than an SIFS.

In this case, the AP may transmit a null frame 1730 for identifying the operation mode of the STA to the STA. The null frame 1730 may be transmitted when the channel is idle for the period of 'AIFS+backoff interval'. The STA operating in the PCR state (e.g., the PCR of the STA) may receive the null frame 1730 from the AP, and transmit an ACK frame 1740, which is a response to the null frame 1730, to the AP within an SIFS from the end time point of the null frame 1730. On the other hand, since the STA operating in the WUR state (e.g., the WURx of the STA) does not receive the null frame 1730, the STA operating in the WUR state may not transmit to the AP the ACK frame 1740 which is the response to the null frame 1730.

The AP receiving the ACK frame 1740 may determine that the STA operates in the PCR state. Also, the AP receiving the ACK frame 1740 may determine that the data frame 1720 has not been successfully received at the STA due to collision with another frame. In this case, the AP point may retransmit a data frame 1750. The data frame 1750 may be transmitted when the channel is idle for the period of 'AIFS+backoff interval'. Alternatively, when the ACK frame 1740 is not received from the STA, the AP may determine that the STA is operating in the WUR state. In this case, the AP may retransmit the wake-up packet to the STA.

Alternatively, instead of the null frame, a BAR frame may be used to identify the operation mode of the STA. The transmission procedure of the frame for identifying the operation mode of the STA may be performed as follows.

FIG. 18 is a timing diagram illustrating a sixth embodiment of a communication method between an access point and a station in a wireless LAN-based communication system.

Referring to FIG. 18, a WLAN based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a wake-up packet 1810. For example, the wake-up packet 1810 may be transmitted when a channel is idle for a period of 'AIFS+backoff interval'. The AP may transmit a data frame 1820 to the STA after a wake-up delay time from the end time point of the wake-up packet 1810. The data frame 1820 may be transmitted when the channel is idle for the period of 'AIFS+backoff interval'. Here, the wake-up delay time may be longer than a time required for the operation mode of the STA receiving the wake-up packet 1810 to transition from the WUR state to the PCR state. That is, the AP may determine that the STA operates in the PCR state after the wake-up delay time from the end time point of the wake-up packet 1810.

The WURx of the STA may receive the wake-up packet 1810 from the AP, and wake up the PCR when an identifier indicated by the wake-up packet 1810 is identical to the identifier of the STA. That is, when the wake-up packet 1810 is received from the AP, the operation mode of the STA may transition from the WUR state to the PCR state. The STA operating in the PCR state may monitor the channel to receive the data frame 1820 from the AP. However, when the data frame 1820 collides with a frame transmitted from another communication node, the STA may not receive the data frame 1820, and accordingly the STA may not transmit an ACK frame for the data frame 1820 to the AP.

The AP may monitor the channel to receive an ACK frame that is a response to the data frame 1820 after the transmission of the data frame 1820. When an ACK frame for the data frame 1820 is not received from the STA within a preconfigured timeout period from the end time point of the data frame 1820, the AP may determine that the wake-up packet 1810 or the data frame 1820 has not been successfully received at the STA. Here, the timeout period may be equal to or longer than an SIFS.

In this case, the AP may transmit a BAR frame 1830 to the STA to confirm the operation mode of the STA. The BAR frame 1830 may be transmitted when the channel is idle for the period of 'AIFS+backoff interval'. The STA operating in the PCR state (e.g., the PCR of the STA) may receive the BAR frame 1830 from the AP, and transmit a BA frame 1840 which is a response to the BAR frame 1830 to the AP within an SIFS from the end time point of the BAR frame 1830. Also, when the data frame 1820 is successfully received (i.e., when the ACK frame in response to the data frame 1820 is not received at the AP due to collision with another frame or transmission failure of the ACK frame itself), the STA may transmit to the AP the BA frame 1840 indicating that the data frame 1820 has been successfully received. On the other hand, since the STA operating in the WUR state (e.g., the WURx of the STA) does not receive the BAR frame 1830, the STA operating in the WUR state may not transmit to the AP the BA frame 1840 which is the response to the BAR frame 1830.

The AP receiving the BA frame 1840 may determine that the STA operates in the PCR state. Further, the AP receiving the BA frame 1840 may determine that the data frame 1820 has not been successfully received at the STA due to collision with another frame. In this case, the AP may retransmit a data frame 1850. The data frame 1850 may be transmitted when the channel is idle for the period of 'AIFS+backoff interval'. Also, when the BA frame 1840 indicates that the data frame 1820 has been successfully received at the STA, the AP may not retransmit the data frame 1850. Alternatively, when the BA frame 1840 is not received from the STA, the AP may determine that the STA operates in the WUR state. In this case, the AP may retransmit the wake-up packet to the STA.

Meanwhile, in case that a groupcast communication is performed in the WLAN based communication system that does not support the use of the WUR poll frame, when an ACK frame for a data frame transmitted after transmission of a wake-up packet for a specific group is not received from STAs belonging to the specific group, the AP may transmit a frame for identifying states (e.g., operation modes) of the STAs belonging to the specific group. The transmission procedure of the frame for identifying the operation modes of the STAs may be performed as follows.

FIG. 19A is a timing diagram illustrating a first sub-embodiment of a seventh embodiment of a communication method between an access point and a station in a wireless LAN-based communication system.

Referring to FIG. 19A, a WLAN based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

When STAs #1 to #3 among the STAs belong to a group #1, the AP may transmit a wake-up packet 1910 for waking up the STAs #1 to #3 belonging to the group #1. For example, the wake-up packet 1910 may be transmitted when a channel is idle for the period of 'AIFS+backoff interval'. The wake-up packet 1910 may include a GID of the group #1. The AP may transmit a data frame 1920 to the STAs #1 to #3 belonging to the group #1 after a wake-up delay time from the end time point of the wake-up packet 1910. The data frame 1920 may be transmitted when the channel is idle for the period of 'AIFS+backoff interval'. The data frame 1920 may include the GID of the group #1 and may include data packets for the STAs #1 to #3 belonging to the group #1. Here, the wake-up delay time may be equal to or longer than the time required for the operation modes of all the STAs #1 to #3 belonging to the group #1 receiving the wake-up packet to transition from the WUR state to the PCR state. That is, the AP may determine that the STAs #1 to #3 operate in the PCR state after the wake-up delay time from the end time point of the wake-up packet 1910.

The WURx of the STAs #1 to #3 belonging to the group #1 may receive the wake-up packet 1910 from the AP, and when the GID indicated by the wake-up packet 1910 is identical to the GID of the group #1, the WURx of the STAs #1 to #3 may wake up the PCR. That is, when the wake-up packet 1910 is received from the AP, the operation modes of the STAs #1 to #3 may be transitioned from the WUR state to the PCR state. The STAs #1 to #3 operating in the PCR state may monitor the channel to receive the data frame 1920 from the AP. However, when the data frame 1920 collides with a frame transmitted from another communication node, the STAs #1 to #3 may not receive the data frame 1920, and accordingly the STAs #1 to #3 may not transmit an ACK frame for the data frame 1920 to the AP.

The AP may monitor the channel to receive an ACK frame that is a response to the data frame 1920 after the transmission of the data frame 1920. When the ACK frame for the data frame 1920 is not received from the STAs #1 to #3 belonging to the group #1 within a preconfigured timeout period from the end time point of the data frame 1920, the AP may determine that the wake-up packet 1910 or the data frame 1920 has not been successfully received at the STAs #1 to #3. Here, the timeout period may be equal to or longer than an SIFS.

In this case, the AP may transmit a BAR frame 1930-1 (or null frame) to the STAs #1 to #3 to confirm the operation modes of the STAs #1 to #3 belonging to the group #1. The BAR frame 1930-1 (or null frame) may include resource information on a resource used for transmission of a BA frame 1940-1 (or ACK frame) which is a response to the BAR frame 1930-1 (or null frame). The resource information included in the BAR frame 1930-1 (or null frame) may indicate a resource for each of the STAs #1 to #3 belonging to the group #1.

The BAR frame 1930-1 (or null frame) may be transmitted when the channel is idle for the period of 'AIFS+backoff interval'. The PCR of the STAs #1 to #3 operating in the PCR state may receive the BAR frame 1930-1 (or null frame) from the AP, and transmit the BA frame 1940-1 (or ACK frame), which is the response to the BAR frame 1930-1 (or null frame), within an SIFS from the end time point of the BAR frame 1930-1 (or null frame). The BA frame 1940-1 (or ACK frame) may be transmitted through the resource indicated by the resource information included in the BAR frame 1930-1 (or null frame). Further, when the data frame 1920 is successfully received (i.e., when the ACK frame in response to the data frame 1920 is not received at the AP due to collision with another frame or transmission failure of the ACK frame itself), the STAs #1 to #3 may transmit to the AP the BA frame 1940-1 indicating that the data frame 1920 has been successfully received. On the other hand, since the STAs #1 to #3 operating in the WUR state (e.g., the WURx of the STAs #1 to #3) do not receive the BAR frame 1930-1 (or null frame), the STAs #1 to #3 operating in the WUR state may not transmit to the AP the BA frames 1940-1 (or ACK frame), which are the responses to the BAR frame 1930-1 (or null frame).

The AP receiving the BA frame 1940-1 (or ACK frame) may determine that the STAs #1 to #3 operate in the PCR state. Also, the AP receiving the BA frame 1940-1 (or ACK frame) may determine that the data frame 1920 has not been successfully received at the STAs #1 to #3 due to a collision with another frame. In this case, the AP may retransmit a data frame 1950. The data frame 1950 may be transmitted when the channel is idle for the period of 'AIFS+backoff interval'. Also, when the BA frame 1940-1 indicates that the data frame 1920 has been successfully received at the STAs #1 to #3, the AP may not retransmit the data frame 1950. Alternatively, when the BA frame 1940-1 (or ACK frame) is not received from the STAs #1 to #3, the AP may determine that the STAs #1 to #3 operate in the WUR state. In this case, the AP may retransmit the wake-up packet to the STAs #1 to #3.

On the other hand, in order to identify the states (e.g., operation modes) of the STAs belonging to the specific group, a group request-to-send (G-RTS) frame and a simultaneous clear-to-send (S-CTS) frame may be used instead of the BAR frame 1930-1 and the BA frame 1940-1.

FIG. 19B is a timing diagram illustrating a second sub-embodiment of a seventh embodiment of a communication method between an access point and a station in a wireless LAN-based communication system.

Referring to FIG. 19B, a WLAN based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

When the STAs #1 to #3 among the STAs belong to the group #1, the AP may transmit a wake-up packet 1910 for waking up the STAs #1 to #3 belonging to the group #1. For example, the wake-up packet 1910 may be transmitted when a channel is idle for the period of 'AIFS+backoff interval'. The wake-up packet 1910 may include a GID of the group #1. The AP may transmit the data frame 1920 to the STAs #1 to #3 belonging to the group #1 after the wake-up delay time from the end time point of the wake-up packet 1910. The data frame 1920 may be transmitted when the channel is idle for the period of 'AIFS+backoff interval'. The data frame 1920 may include the GID of the group #1 and may include data packets for the STAs #1 to #3 belonging to the group #1. Here, the wake-up delay time may be equal to or longer than the time required for the operation modes of all the STAs #1 to #3 belonging to the group #1 receiving the wake-up packet to transition from the WUR state to the PCR state. That is, the AP may determine that the STAs #1 to #3 operate in the PCR state after the wake-up delay time from the end time point of the wake-up packet 1910.

The WURx of the STAs #1 to #3 belonging to the group #1 may receive the wake-up packet 1910 from the AP, and when the GID indicated by the wake-up packet 1910 is identical to the GID of the group #1, the WURx of the STAs #1 to #3 may wake up the PCR. That is, when the wake-up packet 1910 is received from the AP, the operation modes of the STAs #1 to #3 may be transitioned from the WUR state to the PCR state. The STAs #1 to #3 operating in the PCR state may monitor the channel to receive the data frame 1920 from the AP. However, when the data frame 1920 collides with a frame transmitted from another communication node, the STAs #1 to #3 may not receive the data frame 1920, and accordingly the STAs #1 to #3 may not transmit an ACK frame for the data frame 1920 to the AP.

The AP may monitor the channel to receive an ACK frame that is a response to the data frame 1920 after the transmission of the data frame 1920. When the ACK frame for the data frame 1920 is not received from the STAs #1 to #3 belonging to the group #1 within a preconfigured timeout period from the end time point of the data frame 1920, the AP may determine that the wake-up packet 1910 or the data frame 1920 has not been successfully received at the STAs #1 to #3. Here, the timeout period may be equal to or longer than an SIFS.

In this case, the AP may transmit a G-RTS frame 1930-2 to the STAs #1 to #3 to confirm the operation modes of the STAs #1 to #3 belonging to the group #1. The G-RTS frame 1930-2 may be configured to be the same as or similar to the multi-user request-to-send (MU-RTS) frame defined in the IEEE802.11ax.

The G-RTS frame 1930-2 may be transmitted when the channel is idle for the period of 'AIFS+backoff interval'. The PCR of the STAs #1 to #3 operating in the PCR state may receive the G-RTS frame 1930-2 from the AP, and transmit to the AP an S-CTS frame 1940-2 which is the response to the G-RTS frame 1940-1. The S-CTS frame 1940-2 may be simultaneously transmitted by the STAs #1 to #3 through the same radio resource, and the S-CTS frame 1940-2 transmitted from the STAs #1 to #3 may have the same signal structure and content.

By performing the procedure of exchanging the G-RTS frame 1930-2 and the S-CTS frame 1940-2, a contention-free period for data transmission after the S-CTS frame 1940-2 may be secured.

When the S-CTS frame 1940-2 is received, the AP may determine that at least one of the STAs #1 to #3 operates in the PCR state. Also, the AP receiving the S-CTS frame 1940-2 may determine that the data frame 1920 has not been successfully received at the STAs #1 to #3 due to a collision with another frame. In this case, the AP may retransmit the data frame 1950. The data frame 1950 may be transmitted after an SIFS within the secured contention-free period, or may be transmitted when the channel is idle for the period of 'AIFS+backoff interval'. Alternatively, when the S-CTS frame 1940-2 is not received from the STAs #1 to #3, the AP may determine that the STAs #1 to #3 operate in the WUR state. In this case, the AP may retransmit the wake-up packet to the STAs #1 to #3.

Meanwhile, when the groupcast communication is performed in the WLAN based communication system that does not support the use of the WUR poll frame, when the ACK frame for the data frame transmitted after transmission of the wake-up packet for the specific group is not received from STAs belonging to the specific group, the AP may transmit a frame for triggering transmission of the WUR poll frame of the STAs belonging to the specific group. The triggering procedure of the WUR poll frame for identifying the operations modes of the STAs may be performed as follows.

FIG. 20 is a timing diagram illustrating an eighth embodiment of a communication method between an access point and a station in a wireless LAN-based communication system.

Referring to FIG. 20, a WLAN based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

When the STAs #1 to #3 among the STAs belong to the group #1, the AP may transmit a wake-up packet 2010 for waking up the STAs #1 to #3 belonging to the group #1. For example, the wake-up packet 2010 may be transmitted when a channel is idle for the period of 'AIFS+backoff interval'. The wake-up packet 2010 may include the GID of the group #1. The AP may transmit a data frame 2020 to the STAs #1 to #3 belonging to the group #1 after the wake-up delay time from the end of the wake-up packet 2010. The data frame 2020 may be transmitted when the channel is idle for the period of 'AIFS+backoff interval'. The data frame 2020 may include the GID of the group #1 and may include data packets for the STAs #1 to #3 belonging to the group #1. Here, the wake-up delay time may be equal to or longer than the time required for the operation modes of all the STAs #1 to #3 belonging to the group #1 receiving the wake-up packet to transition from the WUR state to the PCR state. That is, the AP may determine that the STAs #1 to #3 operate in the PCR state after the wake-up delay time from the end time point of the wake-up packet 2010.

The WURx of the STAs #1 to #3 belonging to the group #1 may receive the wake-up packet 2010 from the AP, and when the GID indicated by the wake-up packet 2010 is identical to the GID of the group #1, the WURx of the STAs #1 to #3 may wake up the PCR. That is, when the wake-up packet 2010 is received from the AP, the operation modes of the STAs #1 to #3 may be transitioned from the WUR state to the PCR state. The STAs #1 to #3 operating in the PCR state may monitor the channel to receive the data frame 2020 from the AP. However, when the data frame 2020 collides with a frame transmitted from another communication node, the STAs #1 to #3 may not receive the data frame 2020, and accordingly the STAs #1 to #3 may not transmit an ACK frame for the data frame 2020 to the AP.

The AP may monitor the channel to receive an ACK frame that is a response to the data frame 2020 after the transmission of the data frame 2020. When the ACK frame for the data frame 2020 is not received from the STAs #1 to #3 belonging to the group #1 within a preconfigured timeout period from the end time point of the data frame 2020, the AP may determine that the wake-up packet 2010 or the data frame 2020 has not been successfully received at the STAs #1 to #3. Here, the timeout period may be equal to or longer than an SIFS.

In this case, the AP may transmit to the STAs #1 to #3 a trigger frame 2030 for triggering transmission of a WUR poll frame 2040 for identifying the operation modes of the STAs #1 to #3 belonging to the group #1. The trigger frame 2030 may include resource information on a resource used for transmission of the WUR poll frame 2040 triggered by the trigger frame 2030. The resource information included in the trigger frame 2030 may indicate a resource for each of the STAs #1 to #3 belonging to the group #1.

The trigger frame 2030 may be transmitted when the channel is idle for the period of 'AIFS+backoff interval'. The PCR of the STAs #1 to #3 operating in the PCR state may receive the trigger frame 2030 from the AP, and transmit the WUR poll frame 2040 to the AP within an SIFS from the end time point of the trigger frame 2030. The WUR poll frame 2040 may be transmitted through the resource indicated by the resource information included in the trigger frame 2030.

When the WUR poll frame 2040 is received from the STAs #1 to #3 belonging to the group #1, the AP may determine that the STAs #1 to #3 belonging to the group #1 operate in the PCR state, and may transmit an ACK frame 2050, which is a response to the WUR poll frame 2040, to the STAs #1 to #3 within an SIFS from the end time point of the WUR poll frame 2040. Here, the transmission of the ACK frame 2050 may be omitted. When the ACK frame 2050 is received from the AP, the STAs #1 to #3 may determine that the WUR poll frame 2040 has been successfully received at the AP.

When the WUR poll frame 2040 is received from the STAs #1 to #3, the AP may determine that the data frame 2020 has not been successfully received at the STAs #1 to #3 due to collision with another frame. In this case, the AP may retransmit the data frame 2060. The data frame 2060 may be transmitted when the channel is idle for the period of 'AIFS+backoff interval'.

Meanwhile, in the WLAN based communication system supporting the use of the WUR poll frame, when a time (hereinafter referred to as a 'transmission delay time') from the transmission time of the wake-up packet to the reception time of the WUR poll frame is longer than a time (hereinafter referred to as a 'retransmission time') from the initial transmission time of the wake-up packet to the time of the retransmission of the wake-up packet caused by the transmission or reception failure of the wake-up packet, the retransmission of the wake-up packet may be performed unnecessarily. That is, when the transmission delay time>the retransmission time, the following problem may occur.

FIG. 21 is a timing diagram illustrating a ninth embodiment of a communication method between an AP and a station in a wireless LAN-based communication system.

Referring to FIG. 21, a WLAN-based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a wake-up packet 2110. For example, the wake-up packet 2110 may be transmitted when the channel is idle for the period of 'AIFS+backoff interval'. When the WUR poll frame is determined to be used in the association procedure or the negotiation procedure for supporting the WUR state, or when the wake-up packet 2110 indicates the transmission of the WUR poll frame, the AP may monitor the channel to receive the WUR poll frame which is a response to the wake-up packet 2110 without transmitting a data frame.

When the wake-up packet 2110 is received from the AP, the WURx of the STA may wake up the PCR when the identifier indicated by the wake-up packet 2110 received from the AP is equal to the identifier of the STA. That is, the operation mode of the STA receiving the wake-up packet 2110 may transition from the WUR state to the PCR state.

However, when the processing time of the frame in the STA is long, the transmission delay time may be longer than the retransmission time. In this case, the AP may retransmit the wake-up packet 2120 before the STA transmits the WUR poll frame. That is, when the WUR poll frame, which is a response to the wake-up packet 2110, is not received within a preconfigured timeout period from the end time point of the wake-up packet 2110, the AP may determine that the operation mode of the STA has not transitioned from the WUR state to the PCR state. The timeout period may be equal to or greater than 'wake-up delay time+the time required for the transmission of the WUR poll frame (e.g., 'AIFS+backoff interval')'. When the WUR poll frame, which is the response to the wake-up packet 2110, is not received from the STA, the AP may retransmit a wake-up packet 2120. For example, the AP may transmit the wake-up packet 2120 when the channel is idle for the period of 'AIFS+backoff interval'.

The STA operating in the PCR state may receive the wake-up packet 2120 from the AP but may not be able to decode the received wake-up packet 2120. When the wake-up packet 2120 is received while the STA performs a channel access procedure (e.g., a CCA procedure, a random access procedure) for transmission of the WUR poll frame after receiving the wake-up packet 2110, the STA may determine that the channel is occupied by another frame, and may interrupt the channel access procedure for transmission of the WUR poll frame and then perform again the interrupted channel access procedure. Therefore, since the time for the STA to operate in the PCR state increases, the power consumption of the STA may increase.

After receiving the wake-up packet 2120, the STA may perform the channel access procedure again, and the STA may transmit the WUR poll frame 2130 to the AP when the channel is idle for the period of 'AIFS+backoff interval'. The AP may receive the WUR poll frame 2130 from the STA, and determine that the operation mode of the STA has transitioned from the WUR state to the PCR state based on the WUR poll frame 2130. When the WUR poll frame 2130 is received from the STA, the AP may transmit an ACK frame 2140, which is a response to the WUR poll frame 2130, to the STA.

Meanwhile, in a WLAN based communication system supporting the use of the WUR poll frame, the WUR poll frame may be retransmitted when the WUR poll frame is not received at the AP due to a collision of the WUR poll frame. The retransmission procedure of the WUR poll frame may be performed as follows.

FIG. 22 is a timing diagram illustrating a tenth embodiment of a communication method between an AP and a station in a wireless LAN-based communication system.

Referring to FIG. 22, a WLAN based communication system may comprise an AP, a plurality of STAs, and the like. The AP may be configured to be the same as or similar to the low-power STA 500 shown in FIG. 5. For example, the AP may include a PCR, a WUR (e.g WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a wake-up packet 2210. For example, the wake-up packet 2210 may be transmitted when the channel is idle for the period of 'AIFS+backoff interval'. When the WUR poll frame is determined to be used in the association procedure or the negotiation procedure for supporting the WUR state, or when the wake-up packet 2210 indicates transmission of the WUR poll frame, the AP may monitor the channel to receive the WUR poll frame 2220 which is a response to the wake-up packet 2210 without transmitting a data frame.

When the wake-up packet 2210 is received from the AP, the WURx of the STA may wake up the PCR when the identifier indicated by the wake-up packet 2210 received from the AP is equal to the identifier of the STA. That is, the operation mode of the STA receiving the wake-up packet 2210 may transition from the WUR state to the PCR state. The STA operating in the PCR state (e.g., the PCR of the STA) may transmit the WUR poll frame 2220, which is the response to the wake-up packet 2210, to the AP.

However, the WUR poll frame 2220 may collide with a frame transmitted from another communication node. In this case, the AP may not receive the WUR poll frame 2220 of the STA. For example, when the WUR poll frame 2220, which is the response to the wake-up packet 2210, is not received within a preconfigured timeout period from the end time point of the wake-up packet 2210, the AP may determine that the operation mode of the STA has not transitioned from the WUR state to the PCR state. Here, the timeout period may be equal to or greater than 'wake-up delay time+the time required for the transmission of the WUR poll frame (e.g., 'AIFS+backoff interval')'. When the WUR poll frame 2220, which is the response to the wake-up packet 2210, is not received from the STA, the AP may retransmit a wake-up packet 2230. For example, the AP may transmit the wake-up packet 2230 when the channel is idle for the period of 'AIFS+backoff interval'.

After transmitting the WUR poll frame 2220, the STA operating in the PCR state may monitor the channel to receive an ACK frame (or data frame) for the transmitted WUR poll frame 2220 for the preconfigured timeout period. Here, when the ACK frame (or data frame) is not received from the AP within the preconfigured timeout period, the STA may determine that the WUR poll frame has not been successfully received at the AP, and retransmit the WUR poll frame 2240.

That is, the STA may perform again the channel access procedure for transmission of the WUR poll frame 2240, and when the channel is idle for the period of 'AIFS+increased backoff interval', the STA may transmit the WUR poll frame 2240 to the AP. When the wake-up packet 2230 is received while the STA performs a channel access procedure for transmission of the WUR poll frame 2240, the STA may determine that the channel is occupied by another frame, and may interrupt the channel access procedure for transmission of the WUR poll frame 2240 and then perform again the interrupted channel access procedure. That is, the transmission delay time of the WUR poll frame 2240 may be increased due to the retransmission of the WUR poll frame 2240, and the transmission delay time of the WUR poll frame 2240 may be further increased by performing again the channel access procedure interrupted by the wake-up packet 2230. The AP may receive the WUR poll frame 2240 from the STA, and determine that the operation mode of the STA has transitioned from the WUR state to the PCR state based on the WUR poll frame 2240.

Meanwhile, in a wireless LAN-based communication system supporting the use of the WUR poll frame, the STA operating in the PCR state may not transmit the WUR poll frame that is the response to the wake-up packet when the STA is not able to decode the wake-up packet. In this case, an unnecessary retransmission procedure of a wake-up packet may be performed as follows.

FIG. 23 is a timing diagram illustrating an eleventh embodiment of a communication method between an access point and a station in a wireless LAN-based communication system.

Referring to FIG. 23, a WLAN-based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The STA may perform a transmission and reception procedure of a data frame with the AP, and may maintain the PCR state even after the transmission and reception procedure of the data frame is completed. On the other hand, when the data frame transmission and reception procedure is completed, the AP may determine that the operation mode of the STA has transitioned from the PCR state to the WUR state. In this case, when it is needed to transmit a new data frame, the AP may transmit a wake-up packet 2310 to wake up the STA again. For example, the wake-up packet 2310 may be transmitted when the channel is idle for the period of 'AIFS+backoff interval'. When the WUR poll frame is determined to be used in the association procedure or the negotiation procedure for supporting the WUR state, or when the wake-up packet 2310 indicates the transmission of the WUR poll frame, the AP may monitor the channel to receive the WUR poll frame that is the response to the wake-up packet 2310 without transmitting a data frame.

The PCR of the STA operating in the PCR state may not be able to detect the wake-up packet 2310 because it cannot decode the wake-up packet 2310. Therefore, the PCR of the STA operating in the PCR state may fail to transmit the WUR poll frame, which is the response to the wake-up packet 2310, to the AP. In this case, the AP may not receive the WUR poll frame of the STA. For example, when the WUR poll frame, which is the response to the wake-up packet 2310, is not received within a preconfigured timeout period from the end time point of the wake-up packet 2310, the AP may determine that the operation mode of the STA has not transitioned from the WUR state to the PCR state. Here, the timeout period may be equal to or greater than 'wake-up delay time+the time required for transmission of the WUR poll frame (e.g., 'AIFS+backoff interval')'.

When the WUR poll frame, which is the response to the wake-up packet 2310, is not received from the STA, the AP may retransmit a wake-up packet 2320. For example, the AP may transmit the wake-up packet 2320 when the channel is idle for the period of 'AIFS+backoff interval'. However, the STA may not be able to receive the wake-up packet 2320 because it continues to operate in the PCR state and therefore fails to transmit to the AP the WUR poll frame which is the response to the wake-up packet 2320.

In order to solve the above-described problem, the STA operating in the PCR state may be designed to decode the wake-up packet according to the following design schemes.

Design scheme #1: The PCR of the STA is designed to be able to receive and decode the wake-up packet.

Design scheme #2: Even when the STA operates in the PCR state, the WURx of the STA is designed to operate in the wake-up state.

Figure 28:
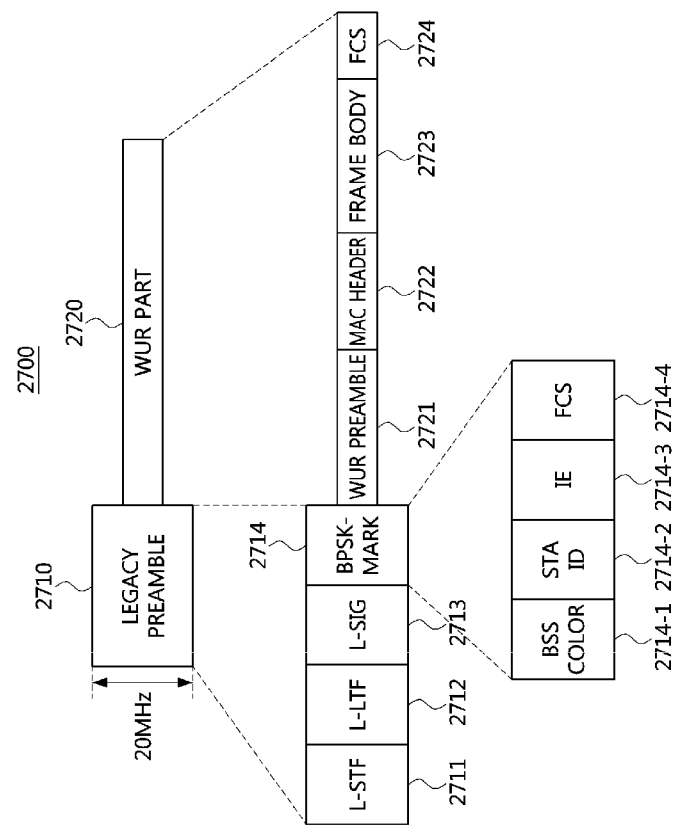
FIG. 28 is a block diagram illustrating a second embodiment of a wake-up packet in a wireless LAN-based communication system.

Design scheme #3: When the wake-up packet is configured as shown in FIG. 28 to be described later, the PCR of the STA is designed to be able to recognize the wake-up packet based on a binary phase shift keying (BPSK) mark field of the wake-up packet.

In this case, the PCR of the STA operating in the PCR state may decode the wake-up packet, and accordingly may transmit to the AP the WUR poll frame which is the response to the wake-up packet. That is, the operation of the STA including the PCR designed to decode the wake-up packet may be as follows.

Figure 24:
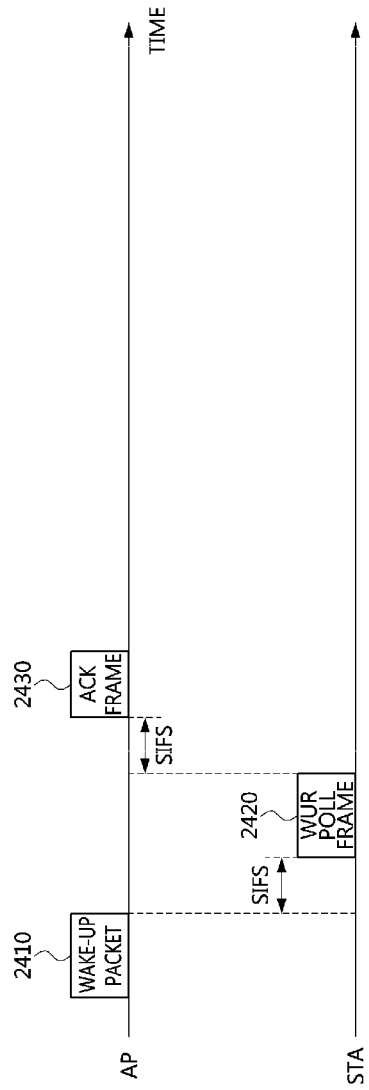
FIG. 24 is a timing diagram illustrating a twelfth embodiment of a communication method between an access point and a station in a wireless LAN-based communication system.

FIG. 24 is a timing diagram illustrating a twelfth embodiment of a communication method between an access point and a station in a wireless LAN-based communication system.

Referring to FIG. 24, a WLAN-based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The STA may perform a transmission and reception procedure of a data frame with the AP, and may maintain the PCR state even after the transmission and reception procedure of the data frame is completed. On the other hand, when the data frame transmission and reception procedure is completed, the AP may determine that the operation mode of the STA has transitioned from the PCR state to the WUR state. In this case, when it is needed to transmit a new data frame, the AP may transmit a wake-up packet 2410 to wake up the STA again. For example, the wake-up packet 2410 may be transmitted when the channel is idle for the period of 'AIFS+backoff interval'. When the WUR poll frame is determined to be used in the association procedure or the negotiation procedure for supporting the WUR state, or when the wake-up packet 2410 indicates the transmission of the WUR poll frame, the AP may monitor the channel to receive the WUR poll frame that is the response to the wake-up packet 2410 without transmitting a data frame.

When the STA is designed based on the design scheme #1, #2 or #3, the PCR of the STA operating in the PCR state may decode the wake-up packet 2410 received from the AP. For example, the PCR of the STA may transmit to the AP a WUR poll frame 2420 which is a response to the wake-up packet 2410 when an identifier indicated by the wake-up packet 2410 received from the AP is the same as the identifier of the STA. The WUR poll frame 2420 may be transmitted within an SIFS from the end of the wake-up packet 2410.

The AP may receive the WUR poll frame 2420 from the STA, and may determine that the STA operates in the PCR state based on the WUR poll frame 2420. Further, the AP may transmit an ACK frame 2430 to the STA within an SIFS from the end of the WUR poll frame 2420. When the ACK frame 2430 is received from the AP, the STA may determine that the WUR poll frame 2420 has been successfully received at the AP.

Meanwhile, in the wireless LAN-based communication system, when the STA is designed based on the design scheme #1, #2 or #3, the retransmission procedure of the WUR poll frame may be performed as follows.

Figure 25:
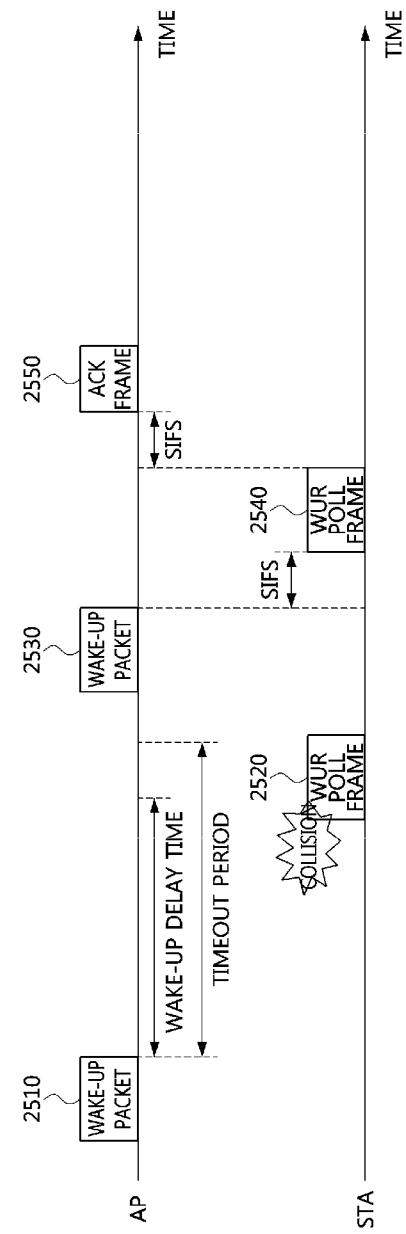
FIG. 25 is a timing diagram illustrating a thirteenth embodiment of a communication method between an access point and a station in a wireless LAN-based communication system.

FIG. 25 is a timing diagram illustrating a thirteenth embodiment of a communication method between an access point and a station in a wireless LAN-based communication system.

Referring to FIG. 25, a WLAN-based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a wake-up packet 2510. For example, the wake-up packet 2510 may be transmitted when the channel is idle for the period of 'AIFS+backoff interval'. When the WUR poll frame is determined to be used in the association procedure or the negotiation procedure for supporting the WUR state, or when the wake-up packet 2510 indicates the transmission of the WUR poll frame, the AP may monitor the channel to receive the WUR poll frame which is a response to the wake-up packet 2510 without transmitting a data frame.

When the wake-up packet 2510 is received from the AP, the WURx of the STA may wake up the PCR when the identifier indicated by the wake-up packet 2510 received from the AP is equal to the identifier of the STA. That is, the operation mode of the STA receiving the wake-up packet 2510 may transition from the WUR state to the PCR state. The STA operating in the PCR state (e.g., the PCR of the STA) may transmit to the AP a WUR poll frame 2520 which is the response to the wake-up packet 2510.

However, when the WUR poll frame 2520 collides with a frame transmitted from another communication node, the AP may not receive the WUR poll frame 2520. That is, when the WUR poll frame 2520 is not received within a preconfigured timeout period from the end of the wake-up packet 2510, the AP may determine that the operation mode of the STA has not transitioned from the WUR state to the PCR state. In this case, the AP may retransmit a wake-up packet 2530. The wake-up packet 2530 may be transmitted when the channel is idle for the period of 'AIFS+backoff interval'.

When the STA is designed based on the design scheme #1, #2 or #3, the PCR of the STA operating in the PCR state may receive the wake-up packet 2530 from the AP, and decode the received wake-up packet 2530. For example, the PCR of the STA may transmit to the AP a WUR poll frame 2540 which is a response to the wake-up packet 2530 when an identifier indicated by the wake-up packet 2530 received from the AP is the same as the identifier of the STA. The WUR poll frame 2540 may be transmitted within an SIFS from the end of the wake-up packet 2530.

When the WUR poll frame 2540 does not collide with a frame transmitted from another communication node, the AP may successfully receive the WUR poll frame 2540. In this case, the AP may determine that the STA operates in the PCR state, and transmit to the STA an ACK frame 2550 which is the response to the WUR poll frame 2540 within an SIFS from the end of the WUR poll frame 2540. When the ACK frame 2550 is received from the AP, the STA may determine that the WUR poll frame 2540 has been successfully received at the AP.

Meanwhile, in the wireless LAN-based communication system supporting the use of the WUR poll frame, when the STA is designed based on the design scheme #1, #2 or #3, the transmission and reception procedure of the data frame may be performed as follows.

Figure 26:
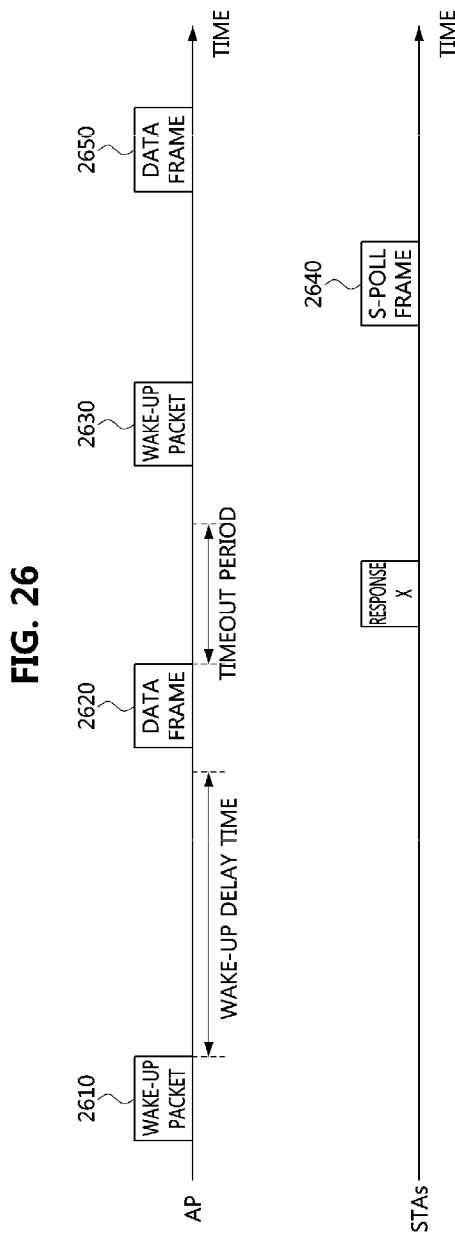
FIG. 26 is a timing diagram illustrating a fourteenth embodiment of a communication method between an access point and a station in a wireless LAN-based communication system.

FIG. 26 is a timing diagram illustrating a fourteenth embodiment of a communication method between an access point and a station in a wireless LAN-based communication system.

Referring to FIG. 26, a WLAN-based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a wake-up packet 2610. For example, the wake-up packet 2610 may be transmitted when the channel is idle for the period of 'AIFS+backoff interval'. The wake-up packet 2610 may be used to wake up the STAs #1 to #3 belonging to the group #1, and may include the GID of the group #1. The AP may transmit a data frame 2620 to the STAs after a wake-up delay time from the end time point of the wake-up packet 2610. The data frame 2620 may be transmitted when the channel is idle for the period of 'AIFS+backoff interval'. Here, the wake-up delay time may be longer than the time required for the operation mode of the STAs receiving the wake-up packet 2610 to transition from the WUR state to the PCR state. That is, the AP may determine that the STAs operate in the PCR state after the wake-up delay time from the end time point of the wake-up packet 2610.

When an ACK frame for the data frame 2620 is not received from the STAs within a preconfigured timeout period from the end of the data frame 2620, since the AP does not know which signal has not been successfully received at the STAs (e.g., the wake-up packet 2610 or the data frame 2620), the AP may perform a transmission procedure of a wake-up packet 2630 again. For example, the AP may retransmit the wake-up packet 2630 when the channel is idle for the period of 'AIFS+backoff interval' after a lapse of the timeout period. Here, the timeout period may equal to or longer than an SIFS.

Meanwhile, when the wake-up packet 2610 is received from the AP, the WURx of the STAs may wake up the PCR when the GID indicated by the wake-up packet 2610 received from the AP is equal to the GID of the group #1 to which the STAs belong. That is, the operation mode of the STA receiving the wake-up packet 2610 may transition from the WUR state to the PCR state. The STAs operating in the PCR state may receive a data frame 2620 from the AP, and may transmit an ACK frame for the data frame 2620 to the AP. However, when the data frame 2620 collides with a frame transmitted from another communication node, the STAs may not receive the data frame 2620, and accordingly may not transmit the ACK frame for the data frame to the AP.

After receiving the wake-up packet 2610 from the AP, the STAs operating in the PCR state may receive the wake-up packet 2630 from the AP. When the STAs are designed based on the design scheme #1, #2, or #3, the STAs may decode the wake-up packet 2630.

When the GID indicated by the wake-up packet 2630 is the same as the GID of the group #1 to which the STAs belong, the STAs may transmit to the AP an S-poll frame 2640 indicating that the STAs operate in the PCR state. The S-poll frame 2640 may be simultaneously transmitted by the STAs through the same radio resource. Also, the S-poll frame 2640 transmitted from the STAs may have the same signal structure and content. The S-poll frame 2640 may be configured to be the same as or similar to the S-CTS frame.

The AP receiving the S-poll frame 2640 may determine that at least one STA among the STAs belonging to the group #1 operates in the PCR state. In this case, the AP may transmit a data frame 2650 to the STAs. The data frame 2650 may be transmitted when the channel is idle for the period of 'AIFS+backoff interval'.

On the other hand, the above-described wake-up packet may be configured as follows.

Figure 27:
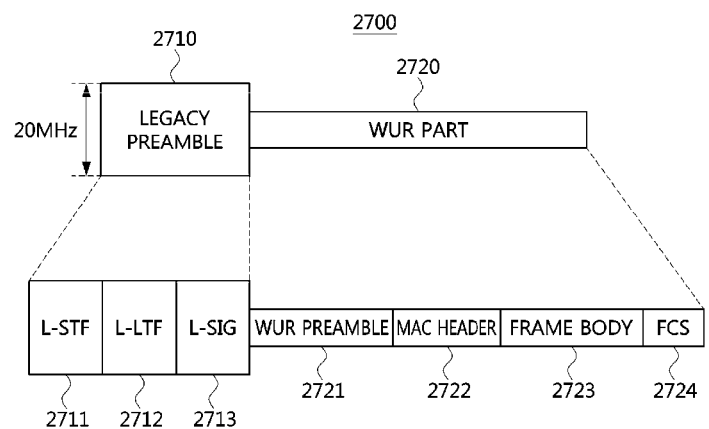
FIG. 27 is a block diagram illustrating a first embodiment of a wake-up packet in a wireless LAN-based communication system.

FIG. 27 is a block diagram illustrating a first embodiment of a wake-up packet in a wireless LAN-based communication system.

Referring to FIG. 27, a wake-up packet 2700 may include a legacy preamble 2710 and a WUR part 2720. Alternatively, the wake-up packet 2700 may be composed of only the WUR part 2720 except the legacy preamble 2710. In this case, the wake-up packet 2700 may be the WUR part 2720. Here, the legacy preamble 2710 may be referred to as a legacy part. The legacy preamble 2710 (e.g., the legacy part) may include a legacy short training field (L-STF) 2711, a legacy long training field (L-LTF) 2712, and a legacy signal (L-SIG) field 2713. The size of a frequency band to which the legacy preamble 2710 is mapped may be 20 MHz.

The WUR part 2720 may include a WUR preamble 2721, a MAC header 2722, a frame body 2723, and a frame check sequence (FCS) field 2724. Alternatively, the WUR part 2720 may include a WUR sync field and a WUR data field. The WUR part 2720 may be modulated and demodulated based on an OOK scheme. The size of a frequency band to which the WUR part 2720 is mapped may be smaller than 20 MHz. For example, the size of the frequency band to which the WUR part 2720 is mapped may be 4 MHz. The WUR preamble 2721 may include a WUR-STF, a WUR-LTF, and a WUR-SIG field. Also, the WUR preamble 2721 may include a pseudo random (PN) sequence used for synchronization between the AP and the low-power STA (e.g., the WURx included in the low-power STA). Also, the PN sequence may indicate a data rate and a bandwidth.

The MAC header 2722 may include a transmitter address field and a receiver address field. For example, the transmitter address field of the MAC header 2722 may indicate the address of the AP transmitting the wake-up packet 2700 and the receiver address field of the MAC header 2722 may indicate the address (e.g., MAC address, AID, PAID, WID, etc.) of the low-power STA to receive the wake-up packet 2700. When the wake-up packet 2700 is transmitted in a broadcast manner, the receiver address field of the MAC header 2722 may indicate that the wake-up packet 2700 is transmitted in a broadcast manner. When the wake-up packet 2700 is transmitted in a multicast manner, the receiver address field of the MAC header 2722 may indicate the address of each of the STAs participating in the multicast transmission. When the wake-up packet 2700 is transmitted in a groupcast manner, the receiver address field of the MAC header 2722 may indicate a group address (e.g., GID).

Meanwhile, a STA supporting IEEE 802.11n may recognize the wake-up packet 2700 as a High Throughput (HT) PPDU, and perform an energy detection operation. Since the resource occupied by the WUR part 2720 in the wake-up packet 2700 is determined to be empty by the energy detection operation, the STA may transmit a frame in the corresponding resource. In this case, a collision between frames may occur. In order to solve this problem, the wake-up packet 2700 may further include a BPSK-mark field as follows.

FIG. 28 is a block diagram illustrating a second embodiment of a wake-up packet in a wireless LAN-based communication system.

Referring to FIG. 28, a wake-up packet 2700 may include the legacy preamble 2710 and the WUR part 2720. Alternatively, the wake-up packet 2700 may be composed of only the WUR part 2720 except the legacy preamble 2710. In this case, the wake-up packet 2700 may be the WUR part 2720. Here, the legacy preamble 2710 may be referred to as a legacy part. The legacy preamble 2710 (e.g., the legacy part) may include the L-STF 2711, the L-LTF 2712, the L-SIG field 2713, and a BPSK mark field 2714. The size of the frequency band to which the legacy preamble 2710 is mapped may be 20 MHz.

The BPSK-mark field 2714 may comprise one or more symbols. The BPSK-mark field 2714 may include a BSS color field 2714-1, an STA ID field 2714-2, an Information Element (IE) field 2714-3, and an FCS field 2714-4. The STA ID field 2714-2 may indicate the identifier of the STA at which the wake-up packet 2700 is to be received. For example, the STA ID field 2714-2 may indicate AID, PAID, WID, BID, or GID. The IE field 2714-3 may include information indicating the usage of the WUR part 2720, information indicating whether the WUR poll frame is transmitted, information indicating whether the trigger frame is transmitted, or the like.

The WUR part 2720 may include the WUR preamble 2721, the MAC header 2722, the frame body 2723, and the FCS field 2724. Alternatively, the WUR part 2720 may include a WUR sync field and a WUR data field. The WUR part 2720 may be modulated and demodulated based on the OOK scheme. The size of the frequency band to which the WUR part 2720 is mapped may be smaller than 20 MHz. For example, the size of the frequency band to which the WUR part 2720 is mapped may be 4 MHz. The WUR preamble 2721 may include the WUR-STF, the WUR-LTF, and the WUR-SIG field.

When the wake-up packet 2700 includes the BPSK-mark field 2714, in the embodiment of FIG. 26, the PCR of the STA operating in the PCR state may decode the BPSK-mark field 2714 included in the wake-up packet 2700 (i.e., the wake-up packet 2610 of FIG. 26). When the identifier indicated by the STA ID field 2714-2 included in the BPSK-mark field 2714 is equal to the identifier of the STA, the STA may determine that the wake-up packet 2700 (i.e., the wake-up packet 2610 of FIG. 26) has been transmitted to wake up itself. In this case, the STA may transmit to the AP the WUR poll frame 2620 in response to the wake-up packet 2700 (i.e., the wake-up packet 2610 of FIG. 26).

Meanwhile, in the wireless LAN-based communication system, a CTS frame may be used to protect the transmission of the wake-up packet. In this case, the transmission procedure of the wake-up packet may be as follows.

FIG. 29 is a timing diagram illustrating a fifteenth embodiment of a communication method between an access point and a station in a wireless LAN-based communication system.

Referring to FIG. 29, a WLAN-based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a CTS frame 2910 to protect the transmission of a wake-up packet 2920. The CTS frame 2910 may be used when the wake-up packet 2920 is retransmitted. The AP may transmit the wake-up packet 2920 to the STA after the transmission of the CTS frame 2910. The transmission scheme of the wake-up packet 2920 may be as follows.

Transmission scheme #1: The wake-up packet 2920 is transmitted together with the CTS frame 2910. That is, the wake-up packet 2920 may be appended to the CTS frame 2910.

Transmission scheme #2: The wake-up packet 2920 is transmitted within a certain IFS (e.g., SIFS or reduced interframe space (RIFS)) from the end of the CTS frame 2910.

Transmission scheme #3: The wake-up packet 2920 is transmitted after a period of 'AIFS+backoff interval' from the end of the CTS frame 2910.

The CTS frame 2910 may include an address field, a duration field, and the like. The address field of the CTS frame 2910 may indicate the address of at least one of the AP and the STA. When the transmission scheme #2 is used, the duration field of the CTS frame 2910 may indicate a duration from the start time (or, end time) of the CTS frame 2910 to the end time of the wake-up packet 2920. Also, when the wake-up packet 2920 is repeatedly transmitted and the transmission scheme #2 is used, the duration field of the CTS frame 2910 may indicate a duration from the start time (or, end time) of the CTS frame 2910 to the end time of the last wake-up packet 2920. When transmission scheme #3 is used, the duration field of the CTS frame 2910 may be set to the length of the CTS frame 2910.

Meanwhile, the WURx of the STA operating in the WUR state may not receive the CTS frame 2910, and may receive the wake-up packet 2920 after the CTS frame 2910. The WURx of the STA may wake up the PCR when the identifier indicated by the wake-up packet 2920 is identical to the identifier of the STA. That is, when the wake-up packet 2920 is received from the AP, the operation mode of the STA may transition from the WUR state to the PCR state. If the STA operates in the PCR state, the STA operating in the PCR state may transmit a response frame (e.g., WUR poll frame, PS-poll frame, general data frame, etc.) for the CTS frame 2910 because the STA operating in the PCR state can receive the CTS frame 2910. The response frame for the CTS frame 2910 may be transmitted after the end of the wake-up packet 2920.

The AP may transmit a data frame 2930 to the STA after a wake-up delay time from the end of the wake-up packet 2920. The data frame 2930 may be transmitted when the channel is idle for the period of 'AIFS+backoff interval'. Here, the wake-up delay time may be longer than the time required for the operation mode of the STA receiving the wake-up packet 2920 to transition from the WUR state to the PCR state. That is, the AP may determine that the STA operates in the PCR state after the wake-up delay time from the end of the wake-up packet 2920.

The STA may receive the data frame 2930 from the AP, and may transmit an ACK frame 2940 to the AP within an SIFS from the end of the data frame 2930. When the ACK frame 2940 is received from the STA, the AP may determine that the data frame 2930 has been successfully received at the STA.

Meanwhile, in the wireless LAN-based communication system, when the CTS frame is used to protect the transmission of the wake-up packet and the STA operates in the PCR state, the STA operating in the PCR state may transmit a WUR poll frame indicating that the STA operates in the PCR state in response to the CTS frame. Accordingly, the communication method may be as follows.

FIG. 30 is a timing diagram illustrating a sixteenth embodiment of a communication method between an access point and a station in a wireless LAN-based communication system.

Referring to FIG. 30, a WLAN-based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a CTS frame 3010 to protect transmission of a wake-up packet 3020, and may transmit to the STA the wake-up packet 3020 within an xIFS from the end of the CTS frame 3010. The xIFS may be SIFS or RIFS. The CTS frame 3010 may include an address field, a duration field, and the like. The address field of the CTS frame 3010 may indicate the address of at least one of the AP and the STA. The duration field of the CTS frame 3010 may indicate 'the length of the CTS frame 3010+xIFS+the length of the wake-up packet 3020' or 'the length of the CTS frame 3010+xIFS+the length of the wake-up packet 3020+SIFS+the length of the response frame 3030'.

The STA operating in the PCR state may receive the CTS frame 3010 from the AP, and determine that the wake-up packet 3020 is to be transmitted based on the received CTS frame 3010. Also, the STA may receive the wake-up packet 3020 from the AP. However, since the operation mode of the STA is the PCR state, the STA may not decode the wake-up packet 3020. The STA may transmit the response frame 3030 (e.g., WUR poll frame) based on the duration indicated by the CTS frame 3010. For example, the STA may transmit to the AP the response frame 3030 (e.g., WUR poll frame) indicating that the STA operates in the PCR state within an SIFS from the end of the wake-up packet 3020.

When the response frame 3030 is received from the STA, the AP may determine that the STA operates in the PCR state, and transmit an ACK frame 3040 to the STA within an SIFS from the end of the response frame 3030. When the ACK frame 3040 is received from the AP, the STA may determine that the response frame 3030 has been received successfully at the AP.

The AP may transmit a data frame 3050 to the STA after the transmission of the ACK frame 3040. When the data frame 3050 is received from the AP, the STA may transmit an ACK frame 3060 to the AP within an SIFS from the end of the data frame 3050. When the ACK frame 3060 is received from the STA, the AP may determine that the data frame 3050 has been successfully received at the STA.

Alternatively, unlike the embodiment shown in FIG. 30, the STA having received the CTS frame 3010 may transmit the response frame 3030 within an SIFS from the end of the CTS frame 3010. Accordingly, the communication method may be as follows.

FIG. 31 is a timing diagram illustrating a seventeenth embodiment of a communication method between an access point and a station in a wireless LAN-based communication system.

Referring to FIG. 31, a WLAN-based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a CTS frame 3110 to protect transmission of a wake-up packet. The CTS frame 3110 may include an address field, a duration field, and the like. The address field of the CTS frame 3110 may indicate the address of at least one of the AP and the STA. The duration field of the CTS frame 3110 may indicate 'the length of the CTS frame 3110+SIFS+the length of the response frame 3120+SIFS+the length of the ACK frame 3130' or 'the length of the CTS frame 3110+SIFS+the length of the response frame 3120'.

The STA operating in the PCR state may receive the CTS frame 3110 from the AP, and determine that the wake-up packet for waking up the STA is to be transmitted based on the received CTS frame 3110. Since the operation mode of the STA is the PCR state, the STA may transmit to the AP the response frame 3120 (e.g., WUR poll frame) indicating that the STA operates in the PCR state within an SIFS from the end of the CTS frame 3110 without receiving the wake-up packet.

The AP may receive the response frame 3120 before transmission of the wake-up packet, and may identify that the STA is operating in the PCR state based on the response frame 3120. In this case, the AP may not transmit the wake-up packet and may transmit the ACK frame 3130 to the STA within an SIFS from the end of the response frame 3120. When the ACK frame 3130 is received from the AP, the STA may determine that the response frame 3120 has been successfully received at the AP.

The AP may transmit a data frame 3140 to the STA after the transmission of the ACK frame 3130. When the data frame 3140 is received from the AP, the STA may transmit an ACK frame 3150 to the AP within an SIFS from the end of the data frame 3140. When the ACK frame 3150 is received from the STA, the AP may determine that the data frame 3140 has been successfully received at the STA.

Meanwhile, in the wireless LAN-based communication system, a traffic indication map (TIM) frame indicating that data for the STA exists in the AP may be transmitted before transmission of a wake-up packet. When a PS-poll frame that is a response to the TIM frame is received, the transmission of the wake-up packet at the AP may be omitted. Accordingly, the communication method may be as follows.

FIG. 32 is a timing diagram illustrating an eighteenth embodiment of a communication method between an access point and a station in a wireless LAN-based communication system.

Referring to FIG. 32, a WLAN-based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit to the STA a TIM frame 3210 indicating that data for the STA is present at the AP before transmitting a wake-up packet. The TIM frame 3210 may be decoded by the PCR of the STA, but may not be decoded by the WURx of the STA.

The PCR of the STA operating in the PCR state may receive the TIM frame 3210 from the AP, and identify that the data for the STA is present at the AP based on the TIM frame 3210. In this case, the STA may transmit a PS-poll frame 3220 requesting transmission of the corresponding data to the AP. Also, the PS-poll frame 3220 may indicate that the STA operates in the PCR state, and a WUR poll frame may be transmitted to the AP instead of the PS-poll frame 3220. The PS-poll frame 3220 may be transmitted within an SIFS from the end of the TIM frame 3210.

The AP may receive the PS-poll frame 3220 before transmission of the wake-up packet, and may identify that the STA is operating in the PCR state based on the PS-poll frame 3220. Also, the AP may confirm that the transmission of data is requested based on the PS-poll frame 3220. In this case, the AP may not transmit the wake-up packet and may transmit an ACK frame 3230 to the STA within an SIFS from the end of the PS-poll frame 3220. When the ACK frame 3230 is received from the AP, the STA may determine that the PS-poll frame 3220 has been successfully received at the AP. On the other hand, when the PS-poll frame 3220, which is the response to the TIM frame 3210, is not received from the STA, the AP may determine that the STA is operating in the WUR state, and accordingly transmit the wake-up packet to the STA.

The AP may transmit a data frame 3240 to the STA after the transmission of the ACK frame 3230. When the data frame 3240 is received from the AP, the STA may transmit an ACK frame 3250 to the AP within an SIFS from the end of the data frame 3240. When the ACK frame 3250 is received from the STA, the AP may determine that the data frame 3240 has been successfully received at the STA.

Alternatively, unlike the embodiment shown in FIG. 32, a null frame may be used to identify the operation mode of the STA. That is, a null frame may be used instead of the TIM frame. Accordingly, the communication method may be as follows.

Figure 33:
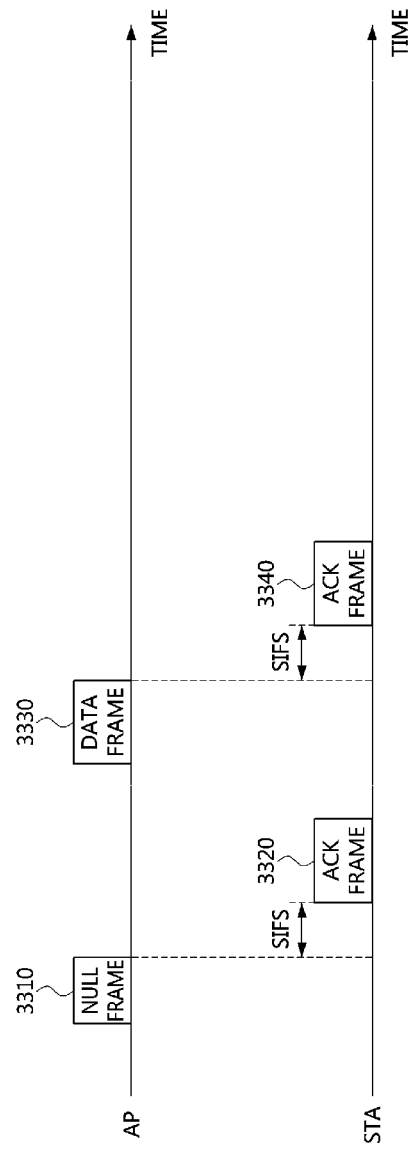
FIG. 33 is a timing diagram illustrating a nineteenth embodiment of a communication method between an access point and a station in a wireless LAN-based communication system

FIG. 33 is a timing diagram illustrating a nineteenth embodiment of a communication method between an access point and a station in a wireless LAN-based communication system.

Referring to FIG. 33, a WLAN-based communication system may comprise an AP, a plurality of STAs, and the like. The AP may be configured to be the same as or similar to the low-power STA 500 shown in FIG. 5. For example, the AP may include a PCR, a WUR (e.g., WURx, WUTx, and an entity that performs the functions of WURx and WUTx), and the like. Further, each of the plurality of STAs may be configured to be the same as or similar to the low-power STA 500 shown in FIG. 5. For example, each of the plurality of STAs may include a PCR, a WURx, and the like. The plurality of STAs may be associated with the AP.

The AP may transmit a null frame 3310 to the STA to identify the operational mode of the STA before transmitting a wake-up packet. The null frame 3310 may be decoded by the PCR of STA, but may not be decoded by WURx of the STA.

The PCR of the STA operating in the PCR state may receive the null frame 3310 from the AP and transmit an ACK frame 3320 to the AP within an SIFS from the end of the null frame 3310. The ACK frame 3320 may indicate that the STA operates in the PCR state.

When the ACK frame 3320 is received from the STA before transmission of a wake-up packet, the AP may determine that the STA is operating in the PCR state based on the ACK frame 3320, and accordingly the AP may not transmit the wake-up packet. Thereafter, the AP may transmit a data frame 3330 to the STA. When the data frame 3330 is received from the AP, the STA may transmit an ACK frame 3340 to the AP within an SIFS from the end of the data frame 3330. When the ACK frame 3340 is received from the STA, the AP may determine that the data frame 3330 has been successfully received at the STA.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a station in a wireless local area network (LAN) based communication system, the station comprising a primary connectivity radio (PCR) and a wake-up receiver (WURx), the PCR operating in a wake-up state in a PCR state (normal state) and operating in a sleep state in a wake-up radio (WUR) state, and the operation method comprising:

performing a negotiation of a WUR power saving mode with an access point to perform a power saving operation using the WURx;

when the negotiation is completed, transitioning an operation mode of the station to the WUR power saving mode;

receiving a wake-up packet instructing to wake up the PCR;

in response to the wake-up packet, transmitting to the access point a response frame indicating that the station operates in the PCR state through the PCR; and receiving a data frame from the access point through the PCR, wherein the wake-up packet includes a legacy preamble and a WUR physical layer convergence protocol (PLCP) protocol data unit (PDU), the legacy preamble is transmitted through a first bandwidth and is not received at the WURx, the WUR PLCP PDU is transmitted through a second bandwidth which is smaller than the first bandwidth and is received at the WURx, the legacy preamble includes a short training field (STF), a long training field (LTF), a signal (SIG) field, and a binary phase shift keying (BPSK)-mark field.

2. The operation method according to claim 1, wherein the BPSK-mark field includes an identifier of the station.

3. An operation method of an access point in a wireless local area network (LAN) based communication system, the operation method comprising:
generating a wake-up packet including a legacy preamble and a wake-up radio (WUR) physical layer convergence protocol (PLCP) protocol data unit (PDU); and
transmitting the wake-up packet,
wherein the legacy preamble includes a short training field (STF), a long training field (LTF), a signal (SIG) field, and a binary phase shift keying (BPSK)-mark field, the legacy preamble is transmitted through a first bandwidth and is not received at a wake-up receiver (WURx) included in a station, and the WUR PLCP PDU is transmitted through a second bandwidth which is smaller than the first bandwidth and is received at the WURx included in the station.

4. The operation method according to claim 3, wherein, when the station includes a primary connectivity radio (PCR) and the WURx, the legacy preamble is decodable by the PCR, and the WUR part is decodable by the WURx.

5. The operation method according to claim 3, wherein the first bandwidth is 20 MHz, and the second bandwidth is smaller than 20 MHz.

6. The operation method according to claim 3, further comprising receiving from the station a WUR-poll frame indicating that the station receiving the wake-up packet has been woken up.

7. The operation method according to claim 3, further comprising transmitting a data frame to the station after a wake-up delay time of the station from an end time of the wake-up packet.

8. The operation method according to claim 3, wherein the BPSK-mark field includes an identifier of the station.

* * * * *